(12) United States Patent
Green

(10) Patent No.: US 11,008,964 B2
(45) Date of Patent: May 18, 2021

(54) ENGINE MONITORING

(71) Applicant: Perkins Engines Company Limited, Peterborough (GB)

(72) Inventor: Christopher J. Green, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/627,538

(22) PCT Filed: Jun. 28, 2018

(86) PCT No.: PCT/EP2018/000327
§ 371 (c)(1),
(2) Date: Dec. 30, 2019

(87) PCT Pub. No.: WO2019/001771
PCT Pub. Date: Jan. 3, 2019

(65) Prior Publication Data
US 2020/0240337 A1    Jul. 30, 2020

(30) Foreign Application Priority Data

Jun. 29, 2017   (GB) ..................................... 1710458

(51) Int. Cl.
*F01M 1/20*   (2006.01)
*F02D 41/00*  (2006.01)
(Continued)

(52) U.S. Cl.
CPC ......... *F02D 41/0087* (2013.01); *G01M 15/12* (2013.01); *F01M 2011/0491* (2013.01);
(Continued)

(58) Field of Classification Search
CPC .... F02D 41/0087; F02D 41/00; F02D 35/027; F02D 2250/18; G01M 15/12;
(Continued)

(56) References Cited

U.S. PATENT DOCUMENTS 4,064,746 A    12/1977  Mercik, Jr. et al.
4,358,828 A    11/1982  Reid et al.
(Continued)

FOREIGN PATENT DOCUMENTS

DE    3604048 A1    8/1987
EP    1087212 A2    3/2001

OTHER PUBLICATIONS

International Search Report for related International Application No. PCT/EP2018/000327; report dated Dec. 3, 2018.
(Continued)

*Primary Examiner* — Hai H Huynh

(57) ABSTRACT

A method and system for engine monitoring comprises a plurality of monitoring devices. A master monitoring device is provided which acts as a communication hub for one or more subsidiary monitoring devices. The master monitoring device is incorporated in or directly attached to the internal combustion engine and functions to sense a characteristic of the internal combustion engine. The monitoring device is configured to transmit data representative of the sensed characteristic to a remote application running on a remote device.

17 Claims, 21 Drawing Sheets

(51) Int. Cl.
*G01M 15/12* (2006.01)
*F01M 11/04* (2006.01)
*F01M 13/00* (2006.01)
*F02D 35/02* (2006.01)

(52) U.S. Cl.
CPC ... *F01M 2013/0083* (2013.01); *F02D 35/027* (2013.01); *F02D 2250/18* (2013.01)

(58) Field of Classification Search
CPC .... G01M 15/05; G01M 15/042; G01M 15/04; G01M 15/048; F01M 2011/0491; F01M 2013/0083
USPC ...... 123/435; 701/107, 111; 73/35.09, 35.13, 73/114.07
See application file for complete search history.

(56) References Cited

U.S. PATENT DOCUMENTS

| | | |
|---|---|---|
| 5,343,754 A | 9/1994 | Stone |
| 6,561,015 B1 | 5/2003 | Pfeiffer |
| 7,484,008 B1 | 1/2009 | Gelvin et al. |
| 2010/0080175 A1 | 4/2010 | Kang et al. |
| 2011/0116416 A1 | 5/2011 | Dobson et al. |
| 2013/0298664 A1 | 11/2013 | Gillette, II |
| 2013/0299000 A1* | 11/2013 | Gillette, II .............. F02D 41/22 137/2 |
| 2017/0090866 A1 | 3/2017 | Vaughn et al. |
| 2020/0149994 A1* | 5/2020 | Green ................... G01M 15/04 |

OTHER PUBLICATIONS

United Kingdom Search Report for related GB Application No. 1710458.9 report dated Dec. 8, 2017.

\* cited by examiner

| Histogram of time (seconds) spent at each firing frequency and crankcase pressure RMS for the engine | | | | | | | | | | | | | | |
|---|---|---|---|---|---|---|---|---|---|---|---|---|---|---|
| | | Speed (rpm) | | | | | | | | | | | | |
| | | 600 | 800 | 1000 | 1200 | 1400 | 1600 | 1800 | 2000 | 2200 | 2400 | 2600 | 2800 | 3000 |
| RMS CCPress (kPa) | 1.5 | | | | | | | | | | | | | |
| | 1.4 | | | | | | | 16 | 65 | 44 | 41 | | | |
| | 1.3 | | | | | | 61 | 100 | 52 | 18 | 81 | | | |
| | 1.2 | | | | | 93 | 12 | 74 | 81 | 1 | 93 | 15 | | |
| | 1.1 | | | | | 57 | 37 | 1 | 51 | 24 | 11 | 41 | | |
| | 1.0 | | | | 85 | 81 | 87 | 99 | 40 | 56 | 37 | 1 | | |
| | 0.9 | | | 1 | 14 | 7 | 79 | 56 | 57 | 87 | 6 | 67 | | |
| | 0.8 | | | 50 | 63 | 64 | 33 | 20 | 40 | 79 | 22 | 57 | | |
| | 0.7 | | | 27 | 53 | 12 | 12 | 99 | 6 | 20 | 4 | 30 | 31 | |
| | 0.6 | | | 23 | 66 | 79 | 33 | 7 | 32 | 82 | 67 | 28 | 39 | |
| | 0.5 | | | | | | | | | | | | | |

ENGINE MONITORING

CROSS-REFERENCE TO RELATED APPLICATION

This Application is a 35 USC § 371 US National Stage filing of International Application No. PCT/EP2018/000327 filed on Jun. 28, 2018 which claims priority under the Paris Convention to United Kingdom Patent Application No. 1710458.9 filed on Jun. 29, 2017.

TECHNICAL FIELD

The present disclosure relates to apparatus and methods for monitoring the performance of an internal combustion engine. For example, the present disclosure relates to smart devices for monitoring the performance of an internal combustion engine and transmitting engine data to a remote device.

BACKGROUND

Physical objects and/or devices are increasingly provided with the capability to be networked together. Often referred to as the "Internet of Things", the ability for objects and/or devices to be uniquely identified and integrated into a communication network allows for additional functionality to be provided. Typically, such networked devices/objects are referred to as "smart" devices/objects.

For example, everyday objects/devices may include a module which monitors the performance/operation of the device and a module which communicates information regarding the performance/operation of the device over a network (i.e. the internet) to a remote device/object. Alternatively, a network connection between device/objects may be used to remotely send instructions and/or control signals to an interconnected device/object.

Typically, a smart device/object communicates with a remote device/object over a network. For example, a remote device to which a "smart" devices/object may connect to may be a server, a smart phone app or another "smart" device. Further, the network connection between the devices may be provided by, for example, an internet connection, a wireless internet connection (WiFi), a Bluetooth connection, a mobile internet connection or a combination of the above.

Often, incorporating "smart" functionality into devices/objects requires special design considerations. The module for performing the monitoring and communication may require a power source and/or a means of communicating over a network. Accordingly, devices/objects are often specially designed to incorporate smart features. As such, incorporating smart features into existing devices is often challenging.

In particular, "smart" functionality is increasingly being incorporated into machines incorporating engines in order to provide improved monitoring of such machines.

One known type of device for monitoring such a machine is an engine data logger. Engine data loggers may be used to monitor various engine parameters over time, such as engine speed. Monitoring engine speed over time may help with analysis of various aspects of the engine and its use, for example how a machine operator is typically using the machine's engine, what likely engine wear may be, etc.

Existing engine data loggers tend to be large and costly, either requiring an interface to a Control Area Network (CAN) bus in order to obtain a reading of the current engine speed from an Engine Control Unit (ECU), or requiring additional measurement equipment (such as mechanical, magnetic or laser tachometers, or fuel measurement equipment). Establishing an interface to the CAN bus may be difficult and time consuming, and providing additional measurement equipment may be costly and inconvenient.

Some existing engine data loggers may be configured to establish an internet connection with a server, where engine speed measurements may be stored over time and/or analysed. Establishing such connections can be costly, inconvenient and potentially unreliable, for example when the machine is located at the geographical limits of an internet network (for example, at the geographical limits of a Radio Access Network (RAN) cell, or at the geographical limits of a WiFi network area, etc.).

Furthermore, it may also be desirable to obtain data in relation to a legacy machine that does not have appropriate inbuilt sensing and/or communications functionality. Accordingly, it may be desirable to attach such sensing functionality to an engine retrospectively. There may be a desire to achieve the functionality with maximum ease and minimum downtime.

SUMMARY

Against this background there is provided in a first aspect of the present disclosure a method for monitoring an internal combustion engine of a machine comprising:
  providing a plurality of monitoring devices incorporated in or directly attached to the internal combustion engine and/or the machine;
  each monitoring device sensing a characteristic of the internal combustion engine and/or the machine;
  configuring one of the plurality of monitoring devices to be a master monitoring device and configuring a remainder of the plurality of monitoring devices to be subsidiary monitoring devices, wherein the master monitoring device is incorporated in or directly attached to the internal combustion engine;
  using the masker monitoring device to transmit data representative of the sensed characteristics from each of the plurality of monitoring devices to a remote application running on a remote device such that data from each of the subsidiary monitoring devices is transmitted to the remote device via the master monitoring device.

In a second aspect of the present disclosure, there is provided a system for monitoring an internal combustion engine of a machine comprising:
  a plurality of monitoring devices incorporated in or directly attached to the internal combustion engine and/or the machine, one of which is configured to be a master monitoring device and which is incorporated in or directly attached to the internal combustion engine and a remainder of the plurality of monitoring devices are configured to be subsidiary monitoring devices; and
  a remote application configured to run on a remote device;
  each monitoring device comprising a sensor configured to sense a characteristic of the internal combustion engine and/or the machine;
  each of the subsidiary monitoring devices comprising a communication module configured to transmit data to the master monitoring device;
the master monitoring device comprising a communication module configured to transmit data received from the subsidiary monitoring devices and data produced by the master monitoring device to the remote application running on the remote device.

In a third aspect of the present disclosure, there is provided a monitoring device configured to form a master monitoring device or a subsidiary monitoring device of the system described above.

In a fourth aspect of the present disclosure, there is provided an internal combustion engine comprising a master monitoring device and/or a subsidiary monitoring device as described above.

In a fifth aspect of the present disclosure, there is provided a machine comprising the internal combustion engine as described above.

DRAWINGS

Some aspects of the present disclosure shall be described, by way of example only, with reference to the following drawings, in which.

DETAILED DESCRIPTION

The present disclosure relates to the monitoring of an internal combustion engine by incorporating or directly attaching a plurality of monitoring devices to the internal combustion engine and or a machine in which the internal combustion engine is incorporated. Each of the plurality of monitoring devices senses a characteristic of the internal combustion engine which may be, for example, a vibration and/or a crankcase pressure of the internal combustion engine.

One or more of the monitoring devices may perform an additional non-monitoring function associated with the internal combustion engine, wherein optionally the additional non-monitoring function is to provide an interface with, or access point to, an oil system of the internal combustion engine. One or more of the monitoring devices may be fluidly coupled to a crankcase of the internal combustion engine.

At least one of the monitoring devices may form a 'smart' ancillary device which is capable of communicating with a remote device and/or intermediate device over a network.

Figure 1:
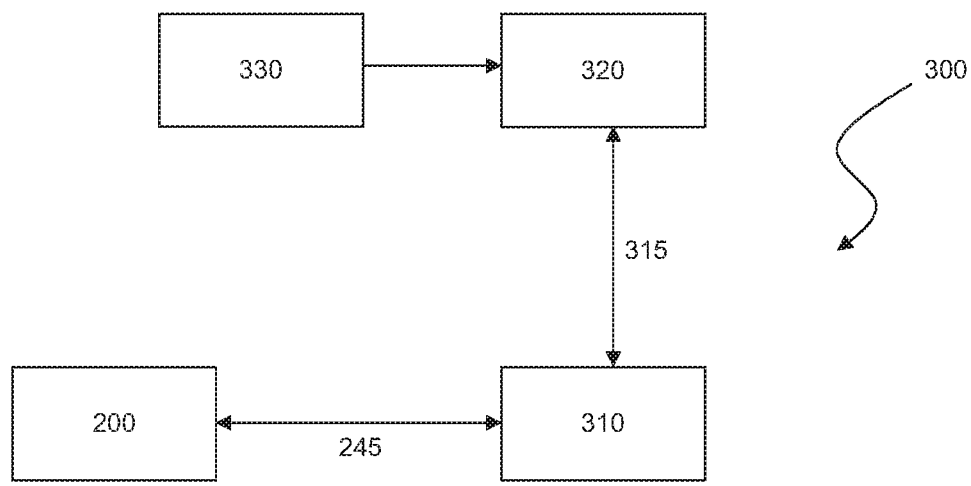
FIG. 1 shows an example system for monitoring an internal combustion engine of a machine according to the present disclosure.

FIG. 1 shows an example system 300 comprising a monitoring device 200, an intermediate electronic device 310 and a remote device 320. The monitoring device 200 and the intermediate electronic device 310 may be coupled to each other via an interface 245. The interface 245 may provide two-way communication between the monitoring device 200 and the intermediate electronic device 310 or may provide only one-way communication from the monitoring device 200 to the intermediate electronic device 310. The intermediate electronic device 310 and the remote device 320 may be network elements. The intermediate electronic device 310 may be a mobile electronic device, such as a mobile telephone (a cell phone), or a smartphone, or a tablet computer, or a laptop computer. The remote device 320 may be a desktop computer or an Internet server or a cloud-based device and may be coupled to the intermediate electronic device 310 via an interface 315. The interface 315 may be an internee connection, or any other suitable form of data connection. The remote device 320 may comprise or be connected to a storage device 330 which may contain engine characterising data of one or more internal combustion engines. The intermediate electronic device 310 may be configured to relay information from all monitoring devices 200 that are within range. The relay of information may function as a background process on the intermediate electronic device 310. Optionally, the remote device 320 may transfer back information to the intermediate electronic device 310 for display to a user. For example, the information may comprise engine monitoring data. Display of information to a user may be restricted by using user privilege settings on the intermediate electronic device 310 and/or the remote device 320.

Figure 2:
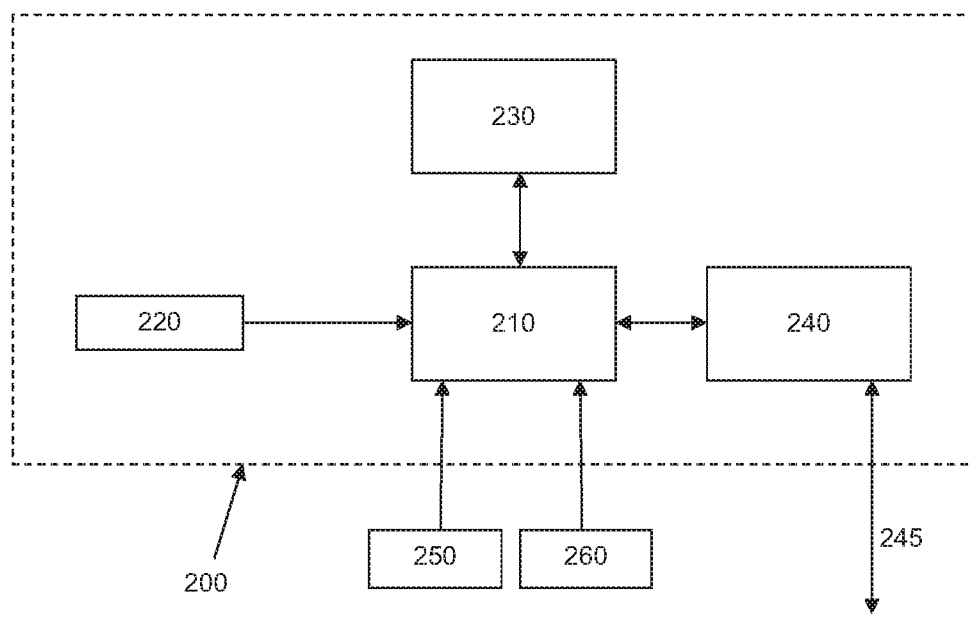
FIG. 2 shows a highly schematic representation of a monitoring device of e system of FIG. 1.

FIG. 2 shows a highly schematic representation of an example of the monitoring device 200 that is suitable for incorporating in or attaching to an internal combustion engine. The monitoring device 200 may comprise a processor module 210 and a vibration sensor 220 coupled to the processor module 210. The monitoring device 200 may also comprise a memory module 230 coupled to the processor module 210, and a communications module 240 coupled to the processor module 210. The processor module 210 may be any form of processing/control module configured to perform the functionality described below. For example, it may be a microcontroller, one or more processors (such as one or more microprocessors), configurable logic, firmware, etc. The vibration sensor 220 may be, for example, an accelerometer, such as a one-axis accelerometer, or a two-axis accelerometer, or a three-axis accelerometer, etc., configured to sense accelerations, for example, such as that caused by vibrations of the internal combustion engine. The vibration sensor 220 may be configured to sense a vibration of the engine and output to the processor module 210 a value indicative of the sensed vibration of the engine. The memory module 230 may utilise any suitable memory technology, for example it may comprise a storage disk and/or a solid-state storage device such flash memory and/or an SD (Secure Digital) card, and may comprise volatile and/or non-volatile memory. The communications module 240 may be configured to support communications with one or more electronic devices external to the monitoring device 200 according to any one or more communications protocols/architectures. For example, the communications module 240 may support one or more types of wired communications, such as USB, Firewire, Thunderbolt, Ethernet, etc. and/or one or more types of wireless communications, such as WiFi, Bluetooth, Bluetooth LE, Near Field Communications (NFC), Infra-red (IR), 5G, LTE, UMTS, EDGE, GPRS, GSM, or any other form of RF based data communications. The communications module 240 may enable at least one communications interface 245 to be established between the monitoring device 200 and an external network element. For example, the network element may be an electronic device, such as an internet server and/or a mobile telephone or smartphone and/or a tablet computer and/or a laptop computer and/or a desktop computer, etc. The interface 245 may be a wired or wireless interface.

The processor module 210 may also be connected to a temperature sensor 250 and/or a pressure transducer 260. The temperature sensor 250 may be configured to sense the crankcase temperature of the engine and may be any suitable type of temperature sensor, for example a digital or analogue temperature sensor. The temperature sensor 250 may be configured to output to the processor module 210 a value indicative of the sensed crankcase temperature. The pressure transducer 260 may be configured to sense the crankcase pressure and may be any suitable type of pressure sensor, for example a piezoelectric sensor with a diaphragm. The pressure transducer 260 may output to the processor module 210 a value indicative of the sensed crankcase pressure. It will be appreciated that in an alternative implementation, the processor module 210 may be connected to only one of the temperature sensor 250 or the pressure transducer 260.

As explained below, the processor module 210 may communicate engine parameter data to the intermediate electronic device 310 via the interface 245, which may in turn communicate at least part of the engine parameter data to the remote device 320, via the interface 315.

Figure 3:
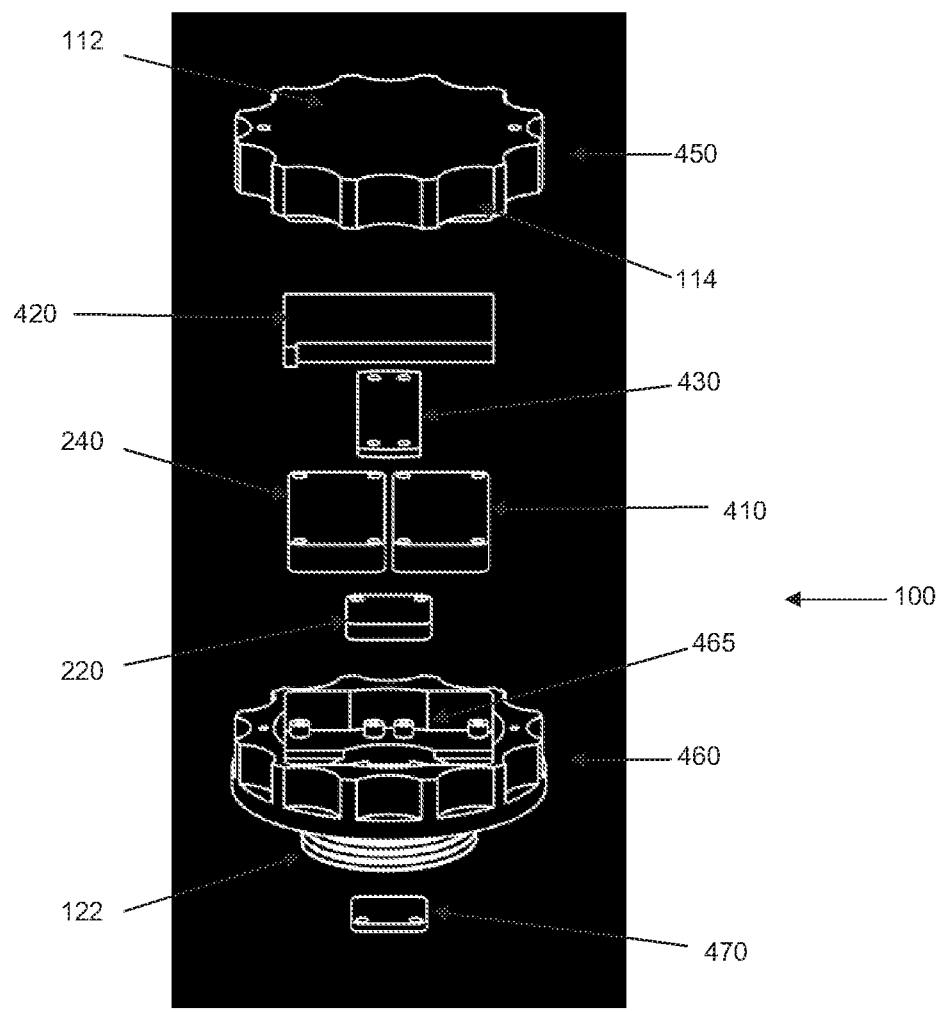
FIG. 3 shows an exploded representation of an assembly of a example of a monitoring device in the form of an oil filler cap.
Figure 4:
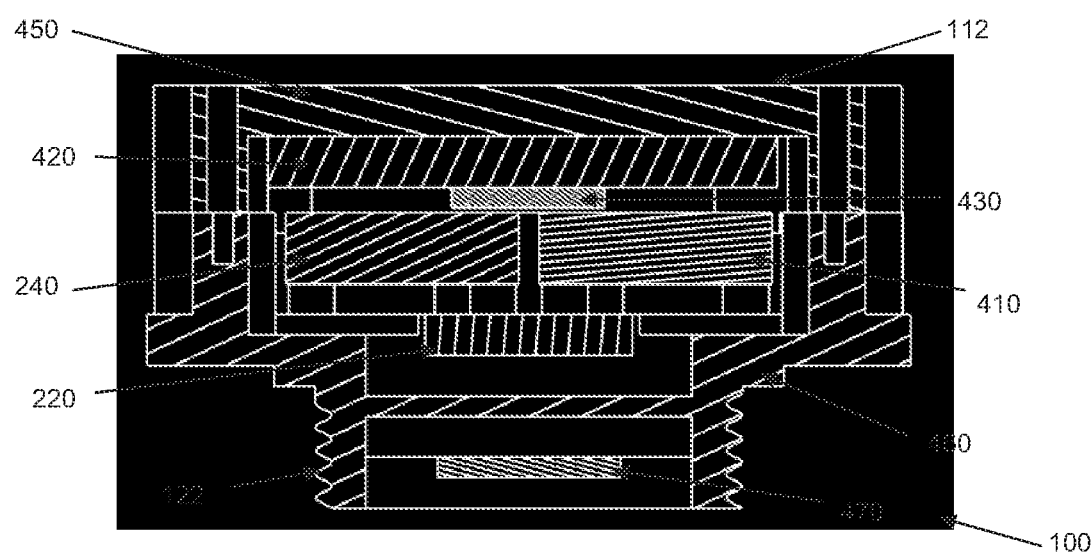
FIG. 4 shows a side-on cut through of the assembly of the oil filler cap of FIG. 3.

FIGS. 3 and 4 show a first example of a 'smart' ancillary device incorporating or forming the monitoring device 200. In this example the 'smart' ancillary device is an oil filler cap 100. A lop surface 112 of the oil filler cap 100 may have a circular, or near-circular, shape when viewed from the top-down. It may have finger grip grooves 114 in the side-wall of the oil filler cap 100, to help with screwing the oil filler cap 100 onto, and unscrewing the oil filler cap 100 from, an internal combustion engine (referred to from here on as 'an engine') such as a diesel engine or a petrol/gasoline engine. It may also have an engine engagement part 122, which is designed to engage with an oil inlet of an engine. As such, the engine engagement part 122 may have an internal or external screw thread for engaging with a corresponding screw thread on the oil inlet of the engine. Thus, the oil filler cap 100 may be screwed into place on the engine in order to cover the oil inlet to prevent dirt or other contaminants entering the engine oil.

It will be appreciated that the external design of the oil filler cap 100 represented in FIGS. 3 and 4 is merely one, non-limiting, example of the external design that an oil filler cap according to the present disclosure may take. The oil filler cap 100 may alternatively have any number of different designs, for example it may exclude the finger grip grooves 114, and/or have a different engine engagement part 122 design, such as a push-fit design rather than a screw thread design, and/or have a different shape, such as a square or rectangular shape, etc. The dimensions and design of the oil filler cap 100 may be influenced at least in part by the design of the engine and oil inlet to which it is to be attached.

FIG. 3 shows an "exploded" representation of an example assembly of the oil filler cap 100. FIG. 4 shows a cross-sectional side-cut of the example assembly of the oil filler cap 100. The assembly may comprise one or more of the components of the monitoring device 200, for example a combined processor and communications module 410, the vibration sensor 220 and the memory module 230. The assembly may further comprise a battery 420 and a battery brace 430. The combined processor and communications module 410, the vibration sensor 220 and the memory module 230 may all arranged within a body cavity 465 in a filler cap body 460. A cover 450 may be fixed to the top of the filler cap body 460 in order to close and seal the body cavity 465. The body cavity 465 may therefore be a mounting point on the oil filler cap 100 for mounting at least some of the components of the monitoring device 200.

The battery 420 and the battery brace 430 may also be arranged within the body cavity 465, although FIG. 4 shows a configuration where the battery 420 and the battery brace 430 are located within a cavity (or space, or hollow space) within the oil filler cap 100 that is formed when the cover 450 is fixed to the top of the filler cap body 460 (for example, a cavity comprising the body cavity 465 and an opposing cavity in the cover 450). In any event, the cavity within the oil filler cap 100 may be a mounting point for at least some of the components of the monitoring device 200 (and optionally also the battery 420), wherein the cavity may be sealed when the cover 450 is fixed to the top of the filler cap body 460, and exposed when the cover 450 is not fixed to the top of the filler cap body 460.

The vibration sensor 220 may be located towards the bottom of the body cavity 465 in the filler cap body 460, such that when the oil filler cap 100 is fitted to the engine, the vibration sensor 220 may be the closest component of the monitoring device 200 to the crankcase of the engine. By arranging these components in this way, the vibration sensor 220 may be positioned close to the engine, which may help to improve its accuracy of vibration sensing. Where the vibration sensor 220 is configured to sense vertical vibrations, it may be mounted horizontally within the body cavity 465, so that when the oil filler cap 100 is fitted to the engine, the vibration sensor 220 is oriented perpendicular to the axis of vibrations that it will be measuring.

The battery brace 430 may be arranged to hold the battery 420 in place and the battery 420 may be located above the monitoring device 200 components, towards the top of the cavity within the oil filler cap 100, such that when the oil filler cap 100 is fitted to the engine, the battery 420 is kept as far away from the engine as possible. During use, the engine may become hot, which can have a deleterious effect on the battery 420. Therefore, by positioning the battery 420 as far from the engine as possible, the battery 420 may be better protected from the heat of the engine. Furthermore, the battery 420 may be more easily accessible for replacement or recharging by removing the cover 450. The cover 450 may be fixed to the filler cap body 460 in any suitable way, for example it may be a removable cover fixed to the filler cap body 460 using a screw thread, or by screws or pins that pass through the cover 450, into the filler cap body 460. In an alternative, the cover 450 may be removably fixed to the filler cap body 460 in any other suitable way, for example using a push-fit fixing. In a further alternative, the cover 450 may be fixed to the filler cap body in a non-removable way, for example by gluing or riveting.

The oil filler cap 100 assembly may further comprise a sensor module 470 comprising the temperature sensor 250 and/or the pressure transducer 260. The sensor module 470 may be mounted on an external surface of the filler cap body 460, on a surface on the underside of the oil filler cap 100, such that when the oil filler cap 100 is fitted to the engine, the sensor module 470 is exposed to the crankcase of the engine so that crankcase temperature and/or crankcase pressure may be sensed by the sensor module 470. The top surface 112 of the oil filler cap 100 may be considered to be a first surface of the oil filler cap 100, and the opposing surface on the underside of the oil filler cap 100, where the sensor module 470 is mounted, may be considered to be a second, opposing surface of the oil filler cap 100.

The sensor module 470 may therefore be physically isolated from at least some of the components of the monitoring device 200, In this way, at least some of the components of the monitoring device 200 may be protected from exposure to oil or debris from the crankcase, and insulated to some extent from heat generated by the engine, whilst still allowing the sensor module 470 to be exposed to the crankcase. The sensor module 470 may be connected to the combined processor and communications module 410 by a wired connection through the filler cap body 460, or by a wireless connection, in order to output the values indicative of the sensed crankcase pressure and/or crankcase temperature.

It will be appreciated that the assembly represented in FIGS. 3 and 4 is only one, non-limiting, example of an assembly of the oil filler cap 100 in accordance with the present disclosure. In an alternative, the components of the monitoring device 200 may be arranged in any way on or within the oil filler cap 100. For example, the monitoring device 200 may be formed as a single unit comprising the components represented in FIG. 2, such as a single circuit board, and designed to be fitted to a mounting point anywhere on the oil filler cap 100. For example, at least some of the components of the monitoring device 200 may be arranged on a single circuit board to be mounted in a cavity in the oil filler cap 100. Alternatively, the components of the monitoring device 200 may be housed within a unit comprising a magnetic element and the mounting point may comprise a ferromagnetic material (such as iron) on the top of an oil filler cap (or the unit may comprise a ferromagnetic material and the mounting point may comprise a magnetic element on top of the oil filler cap). Alternatively, the components of the monitoring device 200 may be housed within a unit designed to push-fit onto a mounting point on the top of an oil filler cap, or designed to screw onto a mounting point on the top of an oil filler cap, etc.

The oil filler cap 100 represented in FIGS. 3 and 4 may also comprise an electrical power connection point, for connecting a power lead from the engine electrical system (for example, the engine battery) to the oil filler cap 100 for providing power to the components within the oil filler cap 100. This may be in addition, or as an alternative, to including the battery 420. For example, where an electrical power connection point is provided in addition to the battery 420, the combined processor and communications module 410, the vibration sensor 220 and the memory module 230 may all be powered by the engine electrical system when the engine is turned on (and optionally the battery 420 also charged) and the memory module 230 may be powered by the battery 420 when the engine is turned off (for example, when the memory module 230 comprises volatile memory). Where an electrical power connection point is provided as an alternative to the battery 420, the combined processor and communications module 410, the vibration sensor 220 and the memory module 230 may all be powered by the engine electrical system when the engine is turned on, and none of the components powered when the engine is turned off (for example, if the memory module 230 comprises non-volatile memory).

Figure 5:
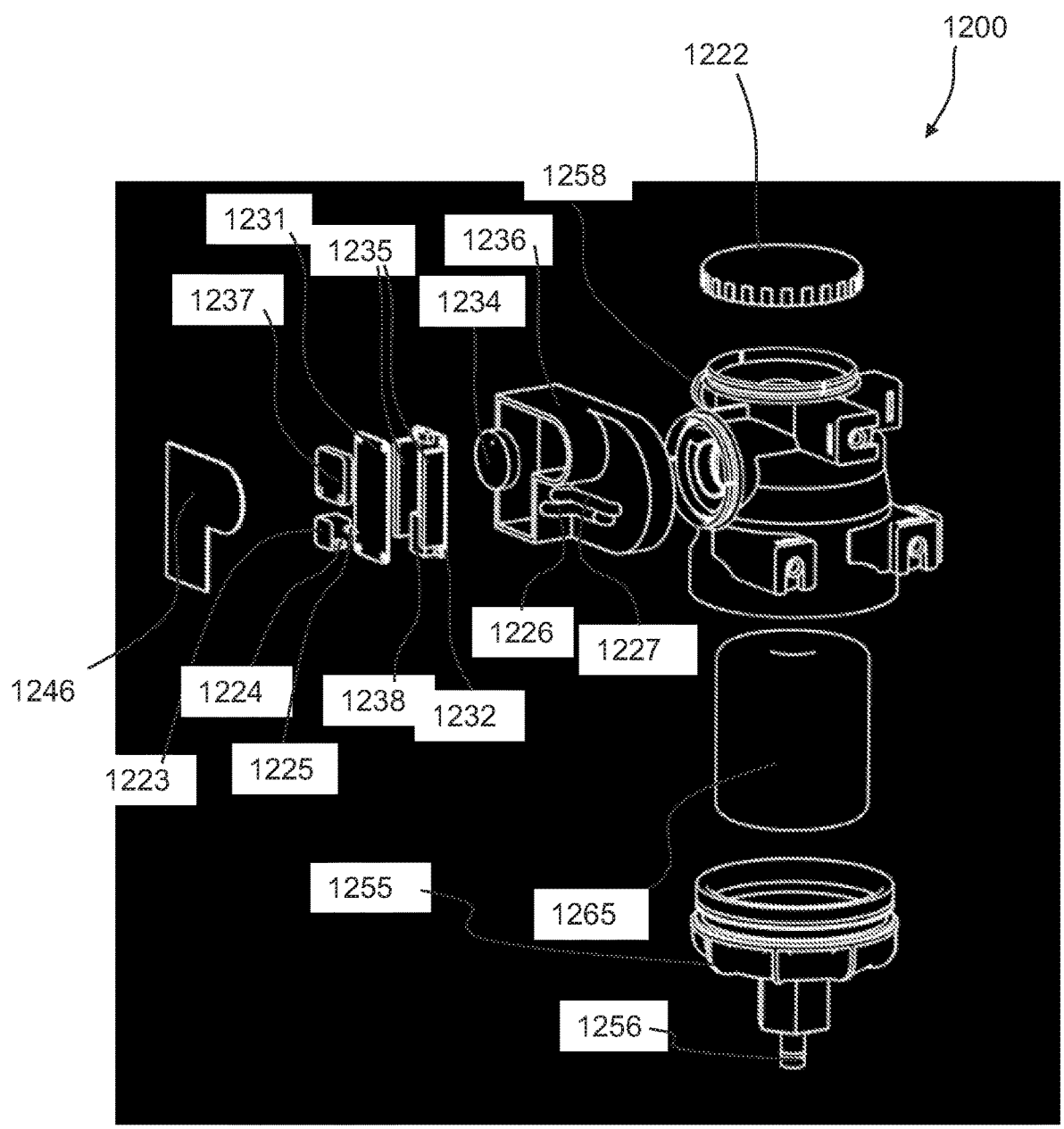
FIG. 5 shows an exploded representation of an assembly of a second example of a monitoring device in the form of a breather filter assembly.
Figure 6:
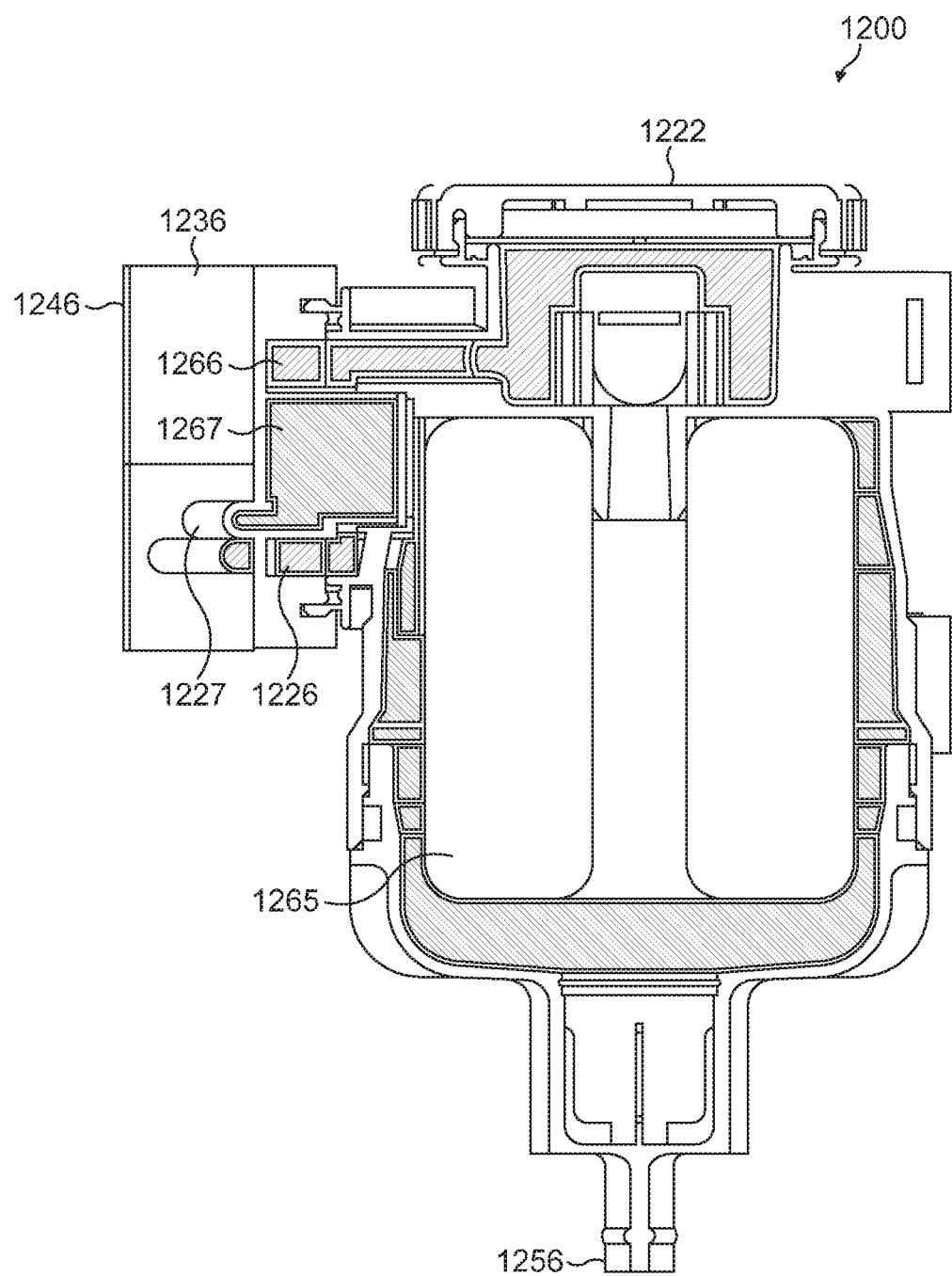
FIG. 6 shows a side-on cut through of the assembly of the breather filter assembly of FIG. 5.
Figure 7:
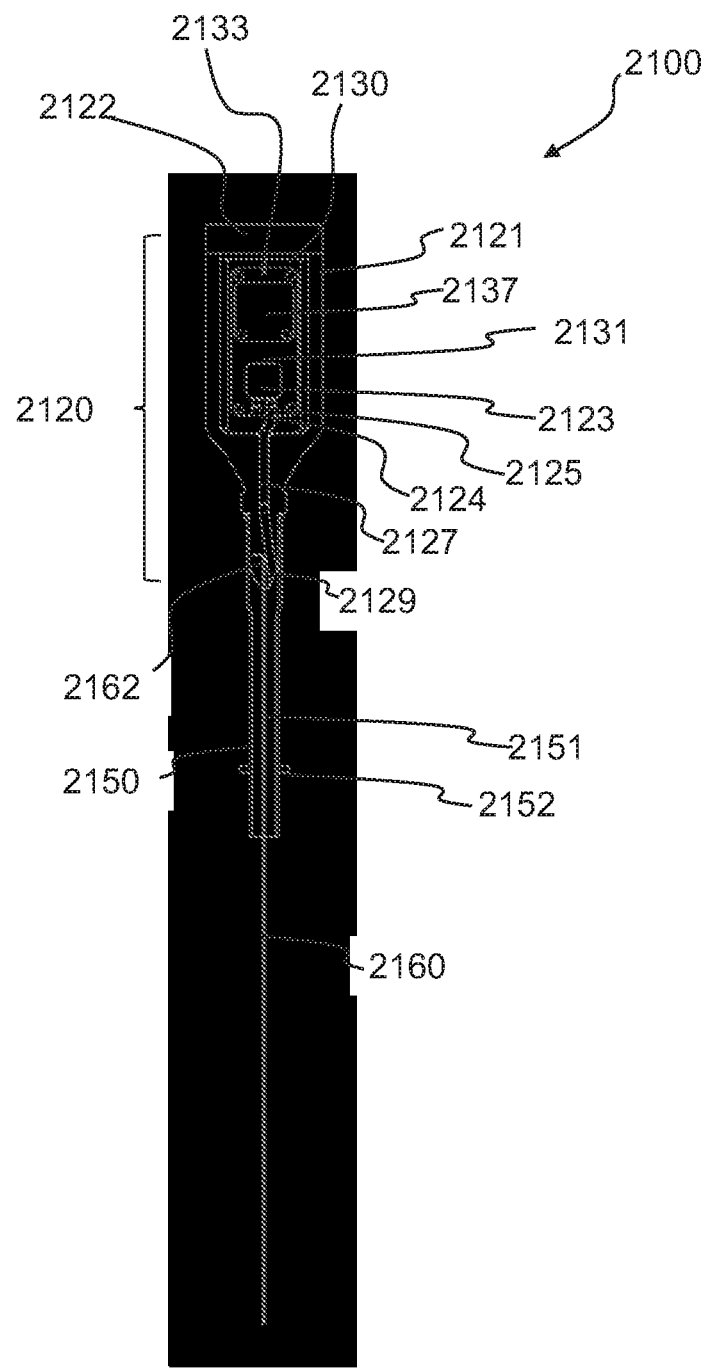
FIG. 7 shows a side-on cut through of the assembly of a third example of a monitoring device in the form of a dipstick.

FIGS. 5 and 6 show a second example of a 'smart' ancillary device incorporating or forming the monitoring device 200. In this example the 'smart' ancillary device is a 'smart' engine breather filter assembly 1200, hereinafter referred to as a breather filter assembly 1200.

The breather filter assembly 1200 comprises a casing 1220 having a casing body 1221, a casing lid 1222 and casing base 1255. Within the casing 1220 is a breather filter cavity configured to house a conventional breather filter element 1265.

The breather filter assembly 1200 further comprises a gas inlet for receiving gas from the crankcase likely to contain airborne oil. The gas 1257 opens into a pre-filter chamber 1267 (see FIG. 6). The breather filter assembly 1200 further comprises a gas outlet 1258 downstream of a post-filter chamber 1266 for channelling back to the crankcase of the engine gas that has been filtered by the breather filter element 1265 in the breather filter cavity. The breather filter assembly 1200 further comprises an oil outlet 1256 for releasing back to the crankcase any oil that has, via the breather filter element 1265, been condensed out of the gas received from the crankcase via the gas inlet.

The casing lid 1222 may seal a first end of the casing body 1221. Similarly the casing base 1255 may seal a second end of the casing body 1221.

Breather filter assembly 1200 provides all the functionality of a prior art breather filter assembly, namely being configured to receive a breather filter for filtering oil out of the crankcase gases.

Referring to FIG. 5, the breather filter assembly 1200 further comprises an electronics housing 1236 fastened to the casing body 1221. The electronics housing 1236 comprises a lid 1246 by which the contents of the housing may be accessed. Within the electronics housing 1236 there is located a differential pressure sensor 1223 and an accelerometer 1237 mounted on a first circuit board 1231. Also contained within the electronics housing 1236 are a communications module 1238 and a processor module 1239 mounted on a second circuit board 1232. The communications module 1138 may comprise a Bluetooth chip or other communication means. The housing further contains a battery 1234. The battery 1234 is connected directly or indirectly to one or both of the circuit boards 1231, 1232 via a pair of supply connectors 1233. Further connections 1235 for data and/or power are provided between the first and second circuit boards 1231, 1232.

The differential pressure sensor 1223 may comprise a first port 1224 and a second port 1225. The differential pressure sensor 1223 may be configured to sense absolute pressure at either or both of the first port 1224 and the second port 1225 or it may be configured to sense differential pressure between the first port 1224 and the second port 1225.

In this way, the differential pressure sensor 1223 may be configured to determine one or more of: absolute pressure downstream of the breather filter element; absolute pressure upstream of the filter; and differential pressure between the first port 1224 and a second port 1225.

As shown in FIG. 6, the breather filter assembly 1200 further comprises first and second conduits 1226, 1227. The first port 1224 is in fluid communication with the first conduit 1226 while the second port 1225 is in fluid communication with the second conduit 1227. Overall, the arrangement results in the first sensor port 1124 being in fluid communication with post-filtered gas and the second sensor port 1126 being in fluid communication with pre-filtered gas. Accordingly, when sensing the differential pressure between the two ports, the sensor senses a pressure difference (e.g. a pressure drop) across the breather filter element 1265.

While, there is shown and described both an accelerometer and a differential pressure sensor, it may be that in alternative embodiments, only one or the other of these two sensors is provided. Furthermore, it may be that an absolute pressure sensor is provided, instead of a differential pressure sensor, for measuring an absolute pressure at either or both of upstream of the filter and downstream of the filter.

In use, the breather filter assembly 1200 is placed in situ on an engine, potentially in direct replacement of a conventional breather filter assembly.

The breather filter assembly 1200, in situ on an internal combustion engine, will vibrate in unison with the engine. Furthermore, the pressure sensor ports will be at the same pressure as the pressure on either side of the breather filter element 1265. Accordingly, a pressure at the first and/or second port of the differential pressure sensor is the same as the pressure, or at least predictably related to the pressure, within the crankcase of the engine. When the breather filter element 1265 is new, the pressure drop across the breather filter element 1265 may be modest. When the breather filter element 1265 has built up hours of use, a build-up of material on the breather filter element 1265 may result in a more sizable pressure difference across the breather filter element 1265.

Data derived from the differential pressure sensor 1223 may be used to calculate one or more of engine speed, torque and altitude.

Data derived from the accelerometer 1237 may be used to calculate engine speed, engine angle, engine orientation, and/or engine incline.

The processor module 1239 receives the sensed differential pressure data from the differential pressure sensor 1223. Every time a cylinder fires, the cylinder pressure increases, forcing the piston downwards. A small amount of this cylinder pressure leaks into the crankcase, past the piston rings and valve seals. This causes a pulse in crankcase pressure every time a cylinder fires. Viewed at high speed, the crankcase pressure pulses occur at a frequency equivalent to the firing frequency of the engine. The processor module 1239 uses the sensed differential pressure data to determine engine firing frequency as described below.

FIGS. 7 to 10 show a third example of a 'smart' ancillary device incorporating or forming the monitoring device 200. In this example the 'smart' ancillary device is an engine oil dipstick 2100, referred hereafter as a dipstick 2100.

The dipstick 2100 comprises a handle 2120, a dipstick tube 2150 and a dipstick gauge 2160. In this way, the dipstick 2100 provides all the functionality of a prior art dipstick, namely being configured to be received into a dipstick insertion aperture of an internal combustion engine. The dipstick tube may comprise an exterior seal 2152 that is configured to abut a corresponding element within the dipstick insertion aperture. In this way, the dipstick insertion aperture is fluidly sealed with the dipstick 2100 in situ. The exterior seal may define a boundary between an inner portion of the dipstick 2100 (so called since it is located inside the engine when in situ) and an outer portion of the smart dipstick (so called since it is located outside the engine when in situ).

The dipstick gauge 2160 comprises a series of markings (not shown) that correspond with a series of volumes of oil that may be present in the engine. The dipstick gauge 2160 is configured such that a film of oil is retained on the dipstick gauge when the dipstick is removed from the dipstick insertion aperture. In this way, an operator can remove the dipstick 2100 from the dipstick insertion aperture to check that an appropriate volume of oil is present.

The handle 2120 comprises a handle body 2121 and a handle lid 2122. The handle 2120 comprises an interior cavity 2130, as shown in FIG. 2, defined by an interior volume within the handle body 2121 and the handle lid 2122. The interior cavity 2130 is discussed in more detail below with reference to FIGS. 8 to 9.

The dipstick tube 2150 comprises a cylindrical interior cavity 2151.

Figure 8:
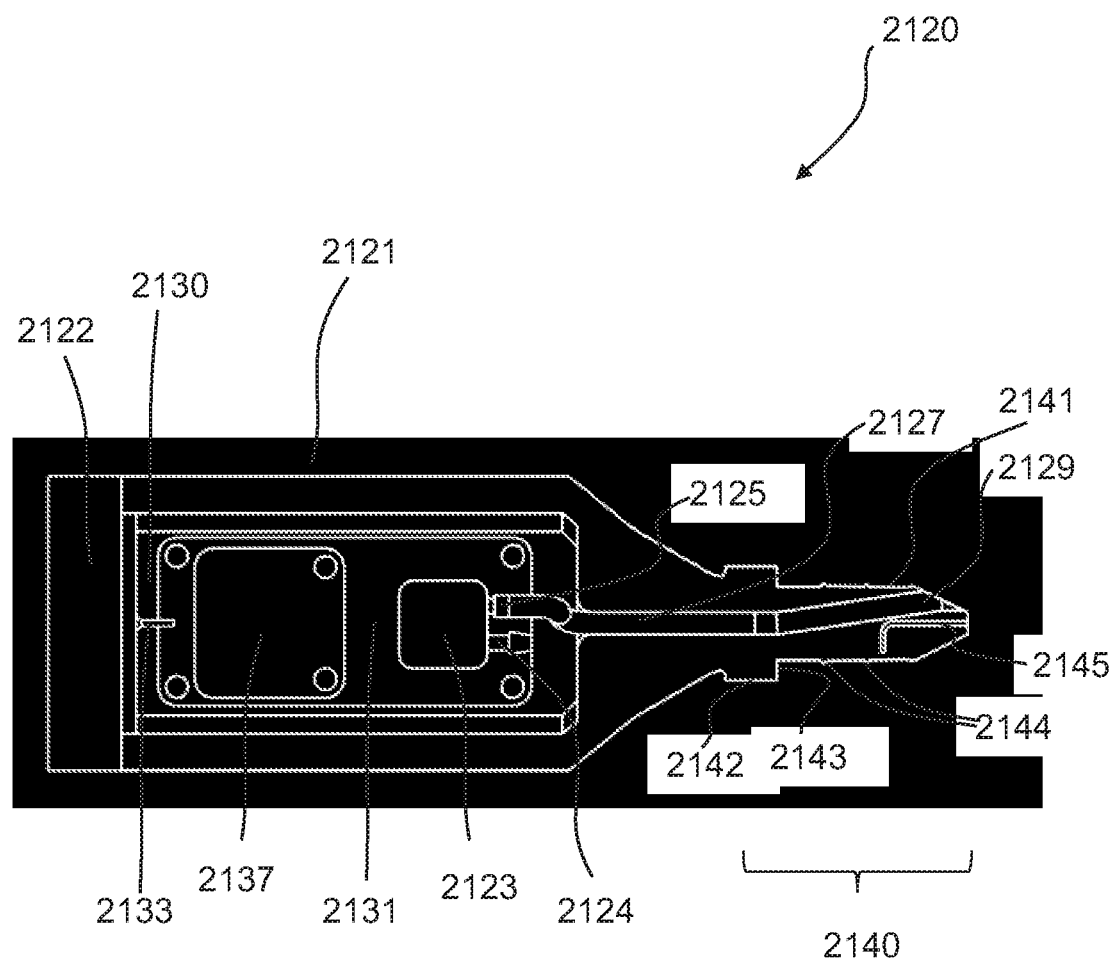
FIG. 8 shows a side-on cut through of a portion of the dipstick of FIG. 7
Figure 9:
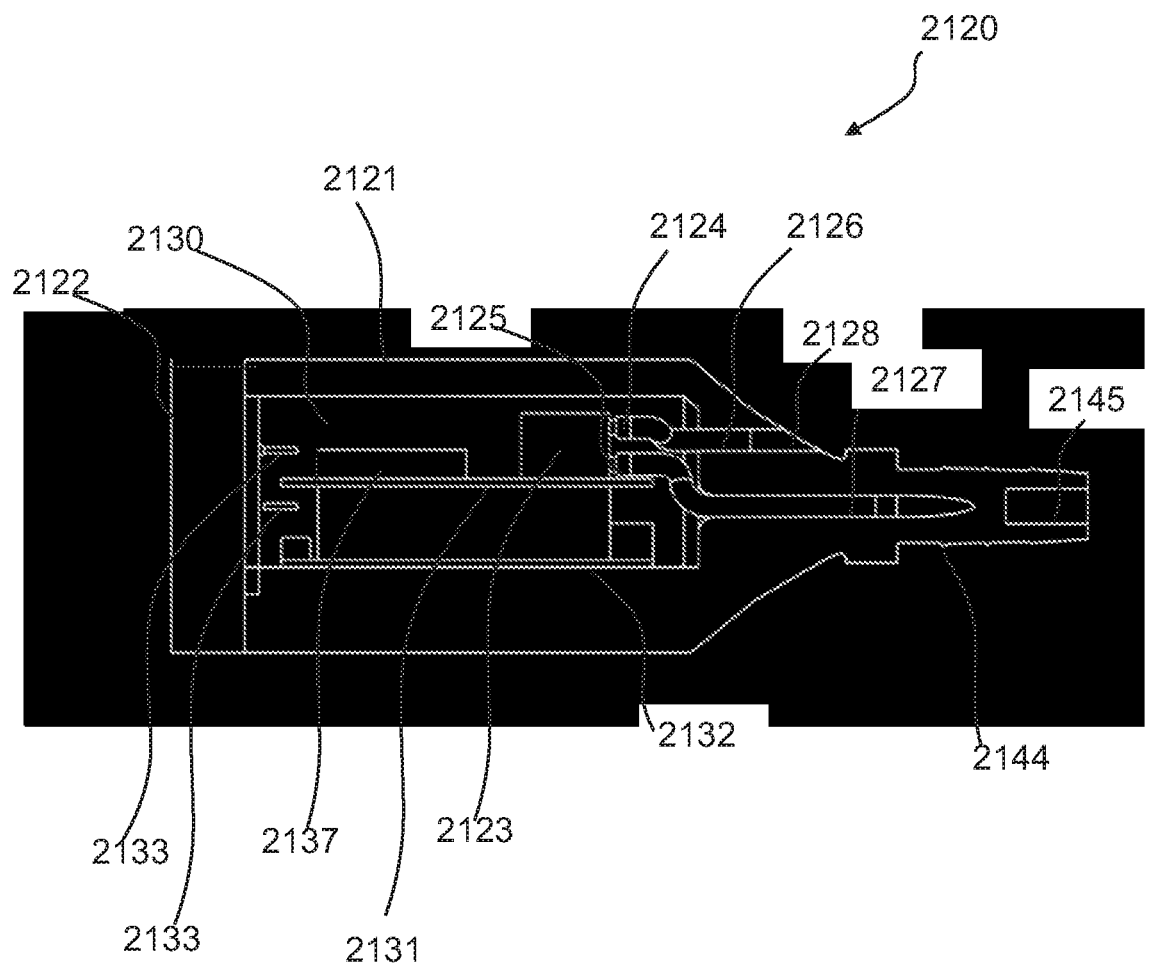
FIG. 9 shows another cut-through of the portion of FIG. 8 on another sectional plane.
Figure 10:
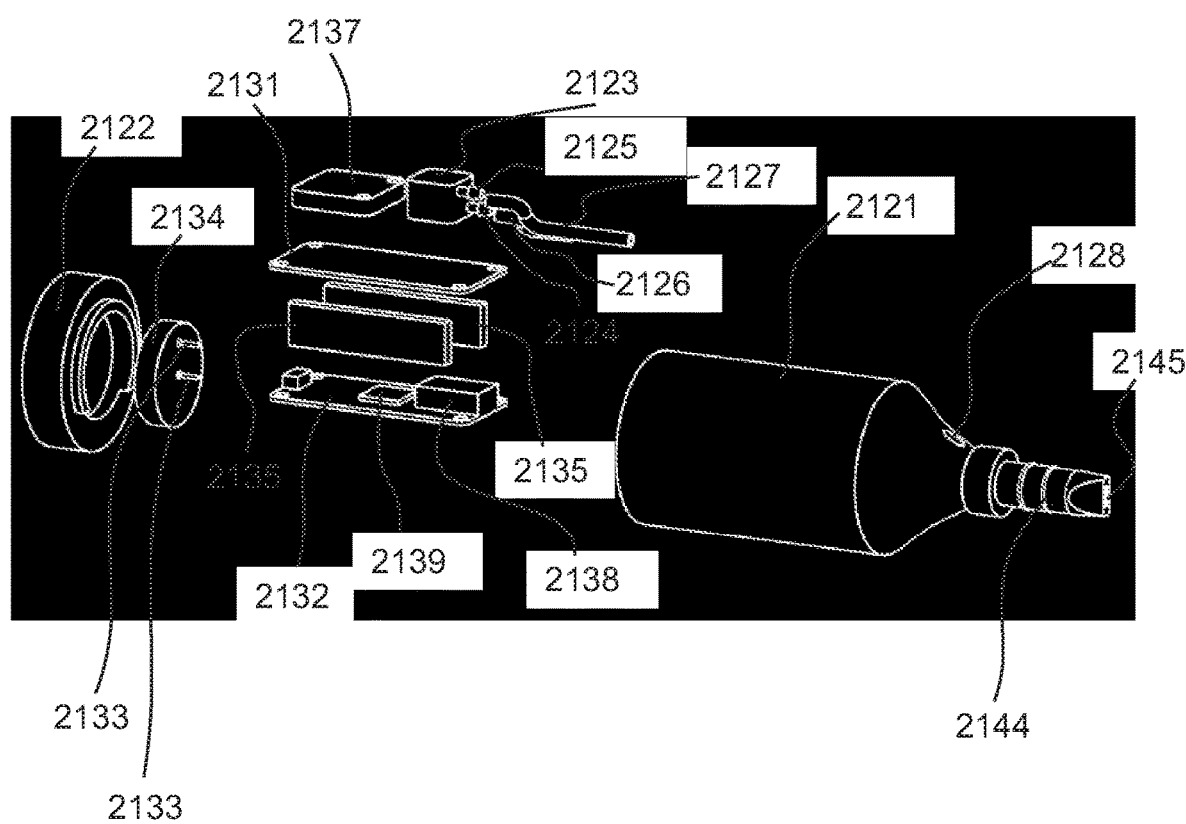
FIG. 10 shows an exploded representation of the portion of FIG. 8.

Referring to FIG. 8, the handle 2120 comprises a nose portion 2140 having a distal end 2141 configured to facilitate connection with the dipstick tube 2150. In particular, an external diameter of the nose portion 2140 is configured to correspond with an internal diameter of the cylindrical interior cavity 2151 of the dipstick tube 2150. In addition, exterior ribs 2144 on the nose portion 2140 provide resistance to axial movement of the dipstick tube 2150 relative to the nose portion 2140 so as to maintain engagement between the dipstick tube 2150 and the nose portion 2140, At a proximal end of the nose portion 2140, opposite the distal end 2141, is located a flange 2142 having an annular face 2143 facing towards the distal end 2141. The annular face 2143 provides a barrier that prevents axial movement of the dipstick tube 2150 beyond a position of full insertion onto the nose portion 2140. The nose portion 2140 further comprises a cavity 2145 for receipt of the dipstick gauge 2160.

The handle 2120 comprises a cavity 2145 for receipt of the dipstick gauge 2160. The cavity 2145 extends into the distal end 2141 of the handle 2120 in a radially central position of the distal end 2141 of the handle 2120 (see FIG. 10). The dipstick gauge 2160 comprises an anchor element 2162 that is received into a curve in the cavity 2145 such that the dipstick gauge 2160 is anchored to the handle 2120. The dipstick gauge 2160 extends centrally through the dipstick tube 2150. The internal diameter of the dipstick tube 2150 is larger than the external diameter of the dipstick gauge 2160.

The handle 2120 comprises a first conduit 2126 and a second conduit 2127. The first conduit 2126 provides fluid communication between the interior cavity 2130 and a first opening 2128 located on an exterior of the handle body 2121 (see FIG. 9). In this way, the first conduit 2126 provides fluid communication with atmosphere. The second conduit 2127 provides fluid communication between the interior cavity 2130 and a second opening 2129 located in the nose portion 2140 and positioned between the annular face 2143 and the distal end 2141 (again, see FIG. 8). In this way, the second conduit 2127 provides fluid communication between the interior cavity 2130 and the interior of the dipstick tube 2150.

As shown in FIG. 8, the second opening 2129 is located in a slanted face of the distal end 2141 that is slanted relative both to a radial plane of the handle 2120 and to an axial plane of the handle 2120. In this way, the second opening 2129 opens directly and without restriction into the interior cavity 2151 of the dipstick tube 2150.

Accordingly, when the dipstick 2100 is received within a dipstick insertion aperture of an internal combustion engine, the second opening 2129 is in direct fluid communication with the interior of the crankcase of the internal combustion engine.

Within the interior cavity 2130 there is provided a differential pressure sensor 2123 for sensing a difference in pressure between a first sensor port 2124 and a second sensor port 2125. The first sensor port 2124 is in fluid communication with the first conduit 2126 while the second sensor port 2125 is in fluid communication with the second conduit 2127.

Overall, the arrangement results in the first sensor port 2124 being in fluid communication with atmosphere and the second sensor port 2125 being in fluid communication with the interior of the dipstick tube 2150. Accordingly, the differential pressure sensor 2123 is configured to sense a pressure difference between the interior of the dipstick tube 2150 and atmosphere. When the dipstick 2100 is located in a dipstick insertion aperture of an internal combustion engine 1 (see FIG. 7), the interior of the dipstick tube 2150 is in fluid communication with the interior of the crankcase of the internal combustion engine.

The interior cavity 2130 comprises a first circuit board 2131 on which are mounted the differential pressure sensor 2123 and an accelerometer 2137. Also within the cavity there is provided a second circuit board 2132 on which are mounted a processor module 2139 and a communications module 2138. The communications module 2138 may comprise a Bluetooth chip or other communication means.

A battery 2134 is located within the interior cavity 2130 and mounted to an interior of the handle lid 2122. The battery is connected directly or indirectly to one or both of the circuit boards 2131, 2132 via a pair of supply connectors 2133. Further connections 2135 for data and/or power are provided between the first and second circuit boards 2131, 2132.

While, there is shown and described both an accelerometer and a differential pressure sensor, it may be that in alternative embodiments, only one or the other of these two sensors is provided. Furthermore, it may be that an absolute pressure sensor is provided, instead of a differential pressure sensor, for measuring an absolute pressure at the second opening 2129.

In use, the dipstick 2100 of the first embodiment of the disclosure is placed into the dipstick insertion aperture until the seal 2152 abuts a corresponding sealing element (not shown) within the dipstick insertion aperture.

As with a prior art dipstick, when the dipstick 2100 is in situ in the dipstick insertion aperture of an internal combustion engine, it will vibrate in unison with the engine.

Furthermore, the interior cavity 2151 of the dipstick tube 2150 will be at the same pressure as the dipstick insertion aperture (on the interior side of the seal 2152 and corresponding element). Accordingly, a pressure at the second sensor port 2125 of the differential pressure sensor 2123 is the same as the pressure, or at least predictably related to the pressure, within the crankcase of the engine.

Data derived from the differential pressure sensor 2123 may be used to calculate one or more of engine speed, torque and altitude.

Data derived from the accelerometer 2137 may be used to calculate engine speed, engine angle, engine orientation, engine incline and/or to note when engine oil level is checked (or, more accurately, to determine when the smart dipstick is removed from the dipstick insertion aperture even though this does not provide certainty that the engine oil level has in fact been checked).

The processor module 2139 receives the sensed differential pressure data from the differential pressure sensor 2123.

Every time a cylinder fires, the cylinder pressure increases, forcing the piston downwards. A small amount of this cylinder pressure leaks into the crankcase, past the piston rings and valve seals. This causes a pulse in crankcase pressure every time a cylinder fires. Viewed at high speed, the crankcase pressure pulses occur at a frequency equivalent to the firing frequency of the engine. The processor module 2139 uses the sensed differential pressure data to determine engine firing frequency as described below.

Figure 11:
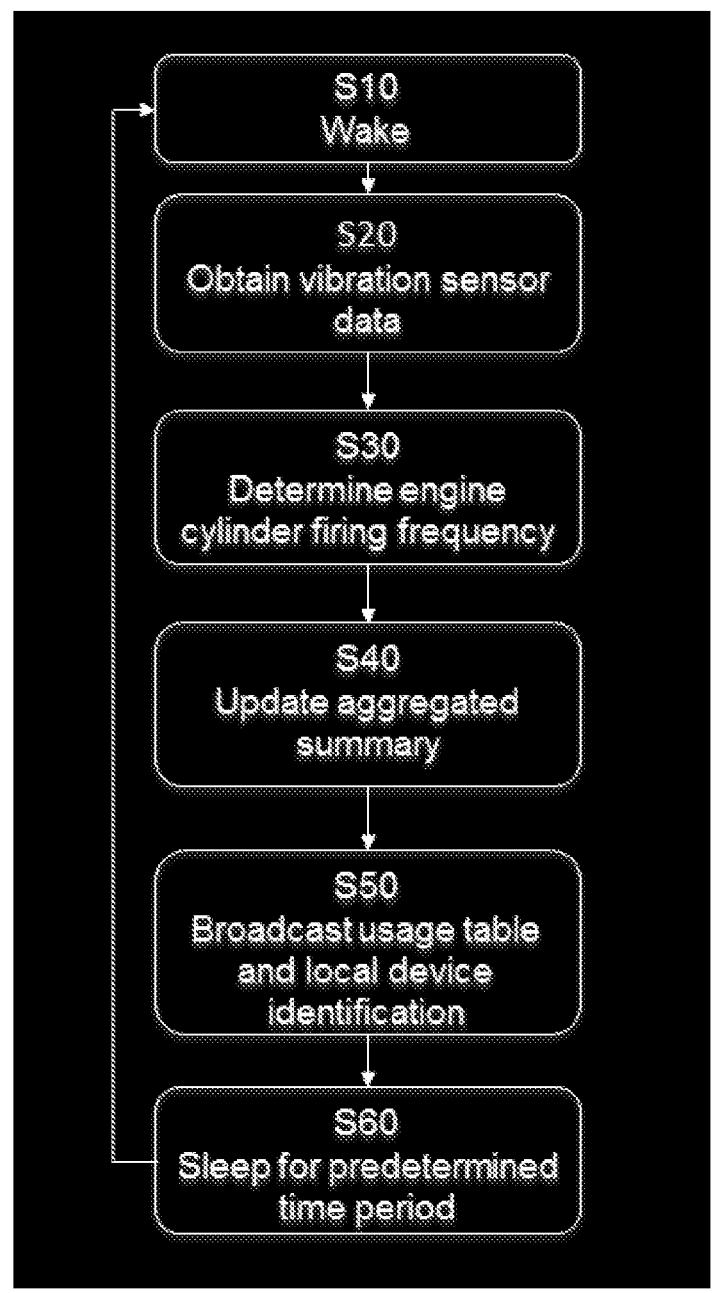
FIG. 11 shows a flow diagram representation of one mode of operation of the monitoring device of FIG. 2.
Figure 12:
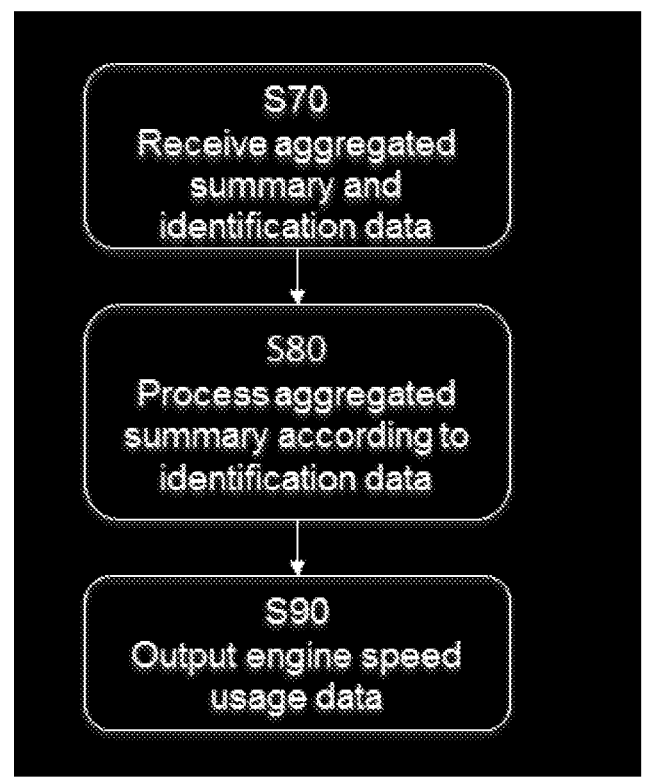
FIG. 12 shows a flow diagram representation of one mode of operation of a remote application.

FIGS. 11 and 12 show an example flow diagram for a mode of operation where the monitoring device 200 (for example one of the monitoring devices described above) comprises a vibration sensor. The method according to this mode of operation may be performed using the monitoring device 200 incorporated in or attached to the internal combustion engine and a remote application running on the intermediate electronic device 310 and/or the remote device 320. FIG. 11 shows, by way of example, the method steps performed by the monitoring device 200 while FIG. 12 shows, by way of example, the method steps performed by the remote application running on the remote device 320.

The following discussion of the method according to this mode of operation will describe the steps taken by the monitoring device 200 in the form of the oil filler cap 100. The skilled person will appreciate that the steps according to this mode of operation may equally be performed by a monitoring device 200 in the form of the breather filter assembly 1200 or the dipstick 2100 having a vibration sensor as described above.

In Step S10 of FIG. 11, the processor module 210 wakes from a lower power state. In step S20, the processor module 210 receives from the vibration sensor 220 data relating to the sensed characteristic of vibration (e.g. vibration data) indicative of the vibration of the internal combustion engine. The processor module 210 samples the vibration data repeatedly over a time period to generate vibration sensor data (a vibration sensor data set). As such, data is generated in the processor module 210 which is representative of the vibration of the internal combustion engine.

The processor module 210 samples the vibration sensor 220 for a determination period of time, which may be any period of time that is sufficient for obtaining a reliable measurement of the firing frequency of the engine cylinders of the internal combustion engine. For example, the determination period of time may be any period of time between 0.01 seconds to 10 minutes, such as 0.1 seconds, or 1 second, or 5 seconds, or 1 minute, or 8 minutes, or any period of time between 0.1 seconds to 1 minute, such as 0.3 seconds, or 3 seconds, or 10 seconds, or any period of time between 1 second to 1 minute, such as 8 seconds, or 42 seconds, etc. The processor module 210 may comprise a clock for counting the determination period of time, such as a processor clock, or a crystal clock, or a GPS synchronised clock. The processor module 210 may generate the vibration sensor data set by periodically sampling the value output from the vibration sensor 220. For example, it may sample the output from the vibration sensor 220 every 2 ms (which is a sampling frequency of 500 Hz) and record each of the sampled values during the determination period of time in order to generate data indicative of the vibration of the engine. The sampling frequency may be any suitable frequency, for example any frequency between 50 Hz-10,000 Hz, such as 200 Hz, or 1000 Hz, or 8000 Hz, or any frequency between 100 Hz-5000 Hz, such as 150 Hz, or 800 Hz, or 2000 Hz, or any frequency between 100 Hz-1000 Hz, such as 400 Hz, or 600 Hz, etc. The sampling frequency may be chosen in consideration of the maximum dominant frequency expected for the engine vibration (for example, a sampling frequency that is sufficiently high to accurately measure the maximum expected dominant frequency in the engine vibration).

Figure 13:
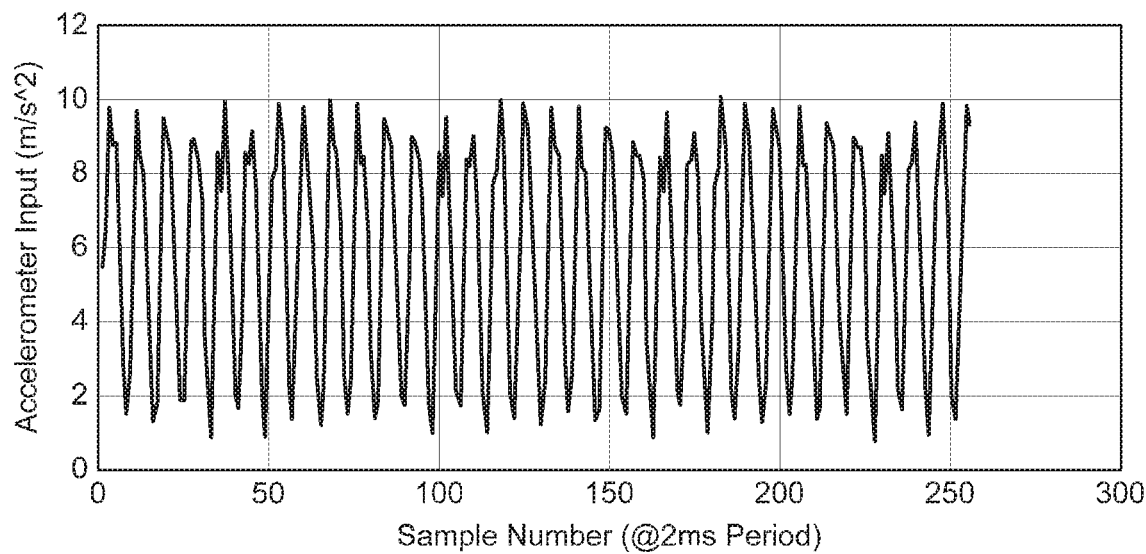
FIG. 13 shows a plot of an example engine vibration measurement taken by a monitoring device.

FIG. 13 shows an example plot of the vibration sensor data generated in Step S20. In this example, the sampling frequency is 500 Hz and the determination period of time is 0.25 second. The x-axis on the plot is the sample number (representative of time) and the y-axis on the plot is the accelerometer output of the vibration sensor 220.

In Step S30, the processor module 210 determines engine parameter data of the internal combustion engine. In this example the engine parameter data is the firing frequency of the cylinders of the engine based on the generated vibration sensor data. The processor module 210 may do this by determining the dominant frequency in the recorded engine vibration, for example by performing a time-to-frequency domain transformation on the vibration sensor data set, such as a Fourier transform, or a Fast Fourier Transform (FFT), or a Laplace transform, etc.

Figure 14:
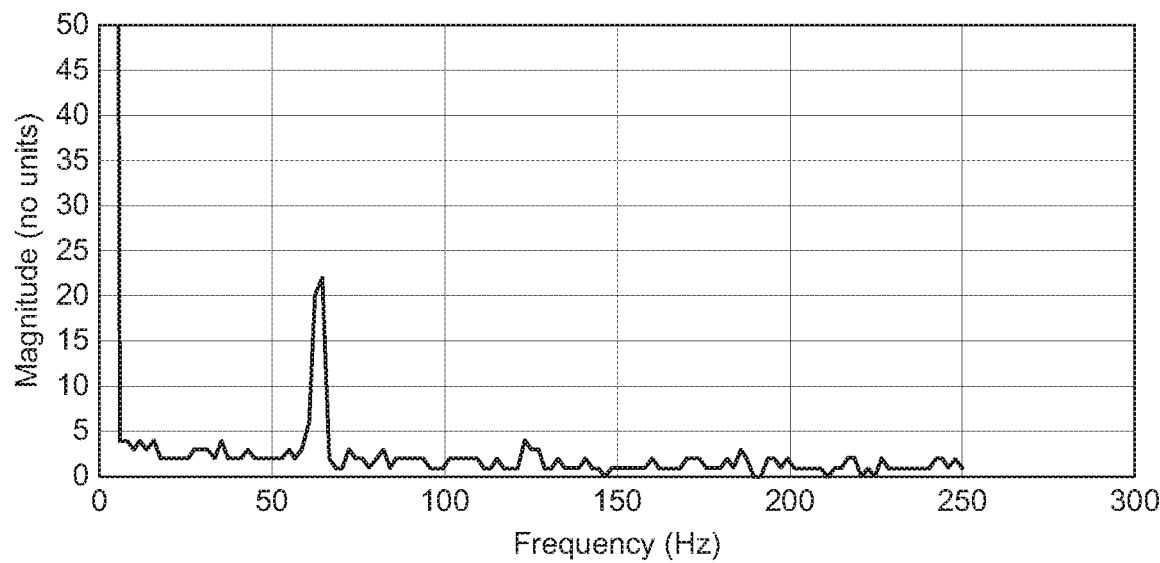
FIG. 14 shows a plot of the frequency response of the engine vibration measurement of FIG. 13.

FIG. 14 shows a plot of the frequency response (i.e., the time-to-frequency transformation) of the recorded engine vibration represented in FIG. 13. The x-axis of the plot in FIG. 14 is frequency in units of Hz and the y-axis of the plot in FIG. 14 is a dimensionless measure of magnitude.

The processor module 210 may determine a dominant frequency of the vibration sensor data set by identifying the frequency with the greatest magnitude in the frequency response plot. The processor module 210 may consider only a particular range of frequencies within the frequency response when finding the dominant frequency. The range may be defined by a lower frequency limit and an upper frequency limit, both of which may be set in consideration of expected engine vibration frequencies, in order to exclude any frequencies that fall outside of expected engine operation. For example, if the idling speed of the engine is expected to generate a vibrational frequency of about 35 Hz and the maximum possible engine speed is expected to generate a vibrational frequency of about 90 Hz, the considered range may be 30 Hz (lower frequency limit) to 100 Hz (upper frequency limit). Of course, the maximum and minimum frequencies that an engine should generate will vary for different types of engine, for example with cylinder configuration (straight cylinder, V cylinder, Boxer, etc.), engine speed limits and engine idle speeds. Therefore, the range of frequencies considered during determination of the dominant frequency may be set to any suitable range in consideration of the engine being assessed.

The dominant frequency may be the frequency corresponding to the peak frequency response, Where there are two or more peaks in the frequency response (for example, because the engine speed changed during the measurement period of time), the dominant frequency may be the frequency corresponding to the peak with the greatest magnitude. Thus, the dominant frequency may be the frequency of vibration that was generated by the engine for the longest period of time during the measurement period of time.

The processor module 210 may then allocate the firing frequency of the engine to be equal to the determined dominant frequency.

So, by performing a time domain to frequency domain transformation of the generated vibration sensor data, engine parameter data in the form of the firing frequency of the internal combustion engine may be determined by the monitoring device 200.

In Step S40, the processor module 210 may record the determined firing frequency of the engine cylinders in the memory module 230. There are a number of different ways in which the determined firing frequency of the engine may be recorded in the memory module 230. One exemplary way in which the determined firing frequency of the engine may be recorded in the memory module 230 is explained below.

The processor module 210 may look up an element of an aggregated summary stored in the memory module 230 based on the determined engine cylinder firing frequency. The aggregated summary may comprise a plurality of elements corresponding to ranges of engine cylinder firing frequencies and the cumulative time for which the engine has been determined to be operating within each of the engine cylinder firing frequency ranges. As such, the aggregated summary is a data table comprising information regarding the usage history of the internal combustion engine for a plurality of ranges of engine firing frequencies. A non-limiting example of an aggregated summary according to this disclosure is set out below:

| Engine cylinder firing frequency | Cumuatve time (Hours) |
|---|---|
| 0 Hz-10 Hz | 4.93 |
| 10 Hz-20 Hz | 6.76 |
| 20 Hz-30 Hz | 5.49 |
| 30 Hz-40 Hz | 2.65 |
| 40 Hz-50 Hz | 1.14 |
| 50 Hz-60 Hz | 5.32 |
| 60 Hz-70 Hz | 9.89 |
| 70 Hz-80 Hz | 3.10 |
| 80 Hz-90 Hz | 3.92 |
| 90 Hz-100 Hz | 0.74 |
| 100 Hz-110 Hz | 6.21 |
| 110 Hz-120 Hz | 4.42 |
| . . . | . . . |

It will be appreciated that the aggregated summary may comprise any number of engine cylinder firing frequency ranges, and the ranges may be of any suitable size and spread.

The processor module 210 may determine which of the plurality of engine cylinder firing frequency ranges the determined engine cylinder firing frequency lies within and then add the determination period of time to the cumulative time for that element of the aggregated summary. As such, the monitoring device 200 generates an aggregated summary by updating an element of the aggregated summary based on the determined firing frequency of the engine. Accordingly, a picture of the operation of the internal combustion engine may be built up over time.

Preferably, the element of the aggregated summary is updated by incrementing the existing value of the element with an amount corresponding to the determination period of time. The determination period of time may be the amount of time elapsed following a previous performance of the engine monitoring routine i.e. the amount of time elapsed since the previous engine firing frequency measurement.

In the example described above in respect of FIGS. 13 and 14, if the determined engine cylinder firing frequency is 60 Hz the processor module 210 may determine that the determined engine cylinder firing frequency lies within the range 60-70 Hz. The processor module 210 may then add the determination period of time to the cumulative time recorded for that element in the aggregated summary. For example, if the cumulative time recorded in the aggregated summary for the element corresponding to the engine firing frequency range of 60-70 Hz is 9.89 hours, and the determination period of time is 27 seconds, the cumulative time recorded in the element representing the range 60-70 Hz will be updated to 9.89 hours+27 seconds.

Having added the determination period of time to the cumulative time for the determined element of the aggregated summary, the processor module 210 may then write the updated element to the aggregated summary in the memory module 230.

It will be appreciated that the engine firing frequency ranges and cumulative times may be saved in the memory module 230 in any suitable way, for example using any known database or matrix techniques.

After recording the determined firing frequency ranges to the memory module in accordance with the above exemplary method, the processor module 210 may return to Step S20. In this way, the engine cylinder firing frequency may be regularly determined, or sampled, (for example, every 0.5 seconds) and then stored in the memory module 230, such that extensive engine firing frequency data may be stored over time without an increase in the size of the aggregated summary stored in the memory module 230.

It will be appreciated that after recording of the values indicative of sensed vibration over the determination period of time is completed in Step S20 and the process proceeds to Step S30, recording of values indicative of sensed vibration for the next determination period of time may immediately begin whilst Steps S30 and S40 are being performed, such that there is no period of operation of the engine that does not contribute to a determination of the engine cylinder firing frequency. Consequently, whilst Steps S30 and S40 are being carried out in respect of the most recently completed recording of the values indicative of sensed vibration, the next recording of values indicative of sensed vibration may already be underway.

In step S50, the processor module 210 may broadcast/transmit the aggregated summary to the remote application. The broadcasting step may be performed every time the aggregated summary is updated. Alternatively, the broadcasting step may only be performed after at least: 50, 100, 200, 500, 1000, or 5000 updates to the aggregated summary. For example, the monitoring device 200 may be configured to broadcast at least once, twice or three times per day. By limiting the number of times the monitoring device 200 broadcasts the aggregated summary, the monitoring device 200 may conserve power and not utilise excessive amounts of bandwidth of a communications network.

Data may be compressed, using known data compression techniques, before transmission/broadcast.

The broadcasting step may take place irrespective of whether a receiving device, for example the intermediate electronic device 310 is within range. Alternatively, the monitoring device 200 may only broadcast once it has determined that a receiving device is within range, for example after performing a suitable handshaking procedure.

The aggregated summary may thus be output periodically to the intermediate electronic device 310 via the interface 245 (for example, 'pushed' to the intermediate electronic device 310), or may be output after the processor module 210 receives a request for the aggregated summary from the intermediate electronic device 310 via the interface 245 (for example, 'pulled' by the intermediate electronic device 310). In an example, the interface 245 may utilise Bluetooth LE and the aggregated summary may be output to the intermediate electronic device 310 if the intermediate electronic device 310 is paired with the monitoring device 200, is within range, and requests, i.e., 'pulls', the aggregated summary data. Likewise, in a further example, if the interface 245 utilises TCP/UDP over Wi-Fi, the intermediate electronic device 310 may be allowed to pull the aggregated summary from the monitoring device 200.

In step S50, the processor module 210 may also broadcast/transmit identification data which allows the remote application to identify the monitoring device 200. For example, the processor module 210 may broadcast a unique identification code, for example a serial number of the monitoring device 200 or a media access control (MAC) address of the monitoring device 200. The remote application may use the identification data of the monitoring device 200 to identify the internal combustion engine to which the monitoring device is attached or within which it is incorporated and/or to identify the machine associated with the monitoring device 200 by comparing the identification data with a database record stored on the storage device 330 accessible by the remote device 320.

With reference to FIG. 12, the operation of the remote application according to this mode of operation will now be described.

As shown in FIG. 12, in step S70 the remote application receives the aggregated summary and identification data from the monitoring device 200. The data may be received over a wireless network, or from the intermediate electronic device 310 forwarding on the transmitted data, or other means as discussed previously above. The aggregated summary received may be the most recently updated version of the aggregated summary stored in the memory module 230 of the monitoring device 200.

As noted above, the identification data received by the remote application may be a unique identification code associated with the monitoring device 200 which allows the remote application to determine the type of internal combustion engine which the monitoring device 200 is monitoring. For example, the monitoring device 200 may transmit a MAC address of the monitoring device 200 which is unique to the monitoring device 200. The remote application may then consult a database to determine engine characterising data related to the internal combustion engine being monitored by the monitoring device 200.

The engine characterising data stored in the database may contain information regarding the monitoring device 200 and/or the internal combustion engine associated with the monitoring device 200. For example, the database may have records for each internal combustion engine in a group of engines that are in current usage. Each engine record may hold information including one or more of the type of engine, the number of cylinders, the number of firing events per engine revolution, cylinder capacity, engine manufacturing date, engine commissioning date, machine type associated with the internal combustion engine, engine owner, engine operator, engine identification data, service interval data, engine component service life data, etc.

The database may contain a link associating each monitoring device 200 with a specific internal combustion engine. This link may be generated when a user or installer performs an initial registration of the monitoring device 200 when the monitoring device 200 is fitted to the internal combustion engine. Initial registration may include sending information such as the monitoring device identification code and an internal combustion engine serial code to the remote application and/or another remote server which then generates the database linkage between the database record containing the engine characterising data and the unique identification code associated with the monitoring device 200. In one example the unique identification code of the monitoring device 200 may be added to the database record for the internal combustion engine.

The monitoring device 200 may be provided with an identifier to facilitate registration. The identifier may be detectable by the remote application and/or the intermediate electronic device 310. For example, the identifier may be an optical or electronic code that can be detected by a reader in the intermediate electronic device 310. In one example the monitoring device 200 may bear a barcode or QR code that can be detected by a camera of the intermediate electronic device 310. In another example the identifier may be an RFID tag that is detected by an RFID reader in the intermediate electronic device 310.

In step S80, the remote application processes the aggregated summary to determine engine monitoring data of the internal combustion engine. For example the engine monitoring data may be engine usage data about the internal combustion engine. For example, the remote application may process the engine cylinder firing frequency ranges into engine speed ranges for the specific internal combustion engine. Accordingly, the processed engine monitoring data may be engine speed usage data which reflects the periods of time spent by the internal combustion engine in each engine speed range.

The remote application may process the engine cylinder firing frequency ranges into engine speed ranges by looking up the engine characterising data for determining a number of combustion events per engine revolution of the internal combustion engine. The engine characterising data may be obtained from the database by the remote application by looking up an entry associated with the identification data transmitted by the monitoring device 200. As such, the remote application uses the identification data to determine the number of cylinders/number of combustion events per revolution of the internal combustion engine which is being monitored by the monitoring device 200.

The engine speed ranges may be calculated from the engine firing frequency ranges as the number of cylinder combustion events, or firing events, per engine revolution depends on the configuration of the cylinders. For example, for a four cylinder straight (in-line) engine, there may be two combustion events per engine revolution. Consequently, the firing frequency would be double the engine speed. However, for a three cylinder straight (in-line) engine, there may be 3 combustion events for every two engine revolutions (i.e., 1.5 combustion events per engine revolution), and for a six cylinder straight (in-line) engine, there may be three combustion events per engine revolution. Consequently, the firing frequency would be one and a half times the engine speed.

The engine firing frequency may therefore be converted into an engine speed by applying the following formula, where the firing frequency is the firing frequency ranges of the engine usage data, and N is the number of combustion events per engine revolution of the identified internal combustion engine.

$$\text{Engine speed} = \frac{\text{Firing frequency (in Hz)} \times 60}{N}$$

Therefore, for a four cylinder straight engine with two combustion events per engine revolution (N=2), the engine speed in RPM may be calculated as follows:

$$\text{Engine speed} = \frac{\text{Firing frequency (in Hz)} \times 60}{2}$$

Accordingly, the above engine speed calculation may be made to each of the engine speed ranges transmitted by the local monitoring device to determine engine speed usage data about the internal combustion engine.

In step S90, the engine speed usage data may be output. The engine speed usage data may be output to a memory associated with the remote application where the engine speed usage data is stored. Alternatively, the engine speed usage data may be output to a display for assessment by a user. The engine speed usage data may be displayed as a histogram to allow a user to quickly assess the usage history of the internal combustion engine.

In addition, the remote application may be configured to provide one of more functions selected from the group comprising: display of cumulative hours of operation of the internal combustion engine, display of technical information of the internal combustion engine associated with the monitoring device, engine service due alerts, engine component replacement due alerts, and location data of dealers and distributors.

Thus, processing the data received from the monitoring device 200 representative of the sensed characteristics and/or the engine parameter data may utilise engine characterising data of the internal combustion engine which is stored on the remote device 320.

In another mode of operation a monitoring device 200 (for example one of the monitoring devices described above) comprising a pressure sensor 260 may be used to determine the firing frequency of the internal combustion engine instead of or in combination with use of a vibration sensor 220. In the following discussion the method according to this mode of operation will describe the steps taken by a monitoring device 200 in the form of the dipstick 2100. For example the pressure sensor 260 may be the differential pressure sensor 2123 of the dipstick 2100. The skilled person will appreciate that the steps according to this mode of operation may equally be performed by a monitoring device 200 in the form of the breather filter assembly 1200 or the oil filler cap 100 having a pressure sensor as described above.

In use the processor module 2139 receives from the differential pressure sensor 2123 sensed differential pressure data relating to the sensed characteristic of pressure (e.g. pressure data) indicative of the difference between a crankcase pressure and an external ambient pressure. The processor module 2139 samples the differential pressure sensor data repeatedly over a time period to generate pressure sensor data (a pressure sensor data set). As such, data is generated in the processor module 2139 which is representative of the crankcase pressure of the internal combustion engine.

The processor module 2139 samples the differential pressure sensor for a determination period of time, which may be any period of time that is sufficient for obtaining a reliable measurement of the firing frequency of the engine cylinders and/or the crankcase pressure of the internal combustion engine. For example, the determination period of time may be any period of time between 0.01 seconds to 10 minutes, such as 0.1 seconds, or 1 second, or 5 seconds, or 1 minute, or 8 minutes, or any period of time between 0.1 seconds to 1 minute, such as 0.3 seconds, or 3 seconds, or 10 seconds, or any period of time between 1 second to 1 minute, such as 8 seconds, or 42 seconds, etc. The processor module 2139 may comprise a clock for counting the determination period of time, such as a processor clock, or a crystal clock, or a GPS synchronised clock. The processor module 2139 may generate the pressure sensor data set by periodically sampling the value output from the differential pressure sensor 2123. For example, it may sample the output from the differential pressure sensor 123 every 2 ms (which is a sampling frequency of 500 Hz) and record each of the sampled values during the determination period of time in order to generate data indicative of the crankcase pressure of the engine. The generated data may also be suitable for recording a plurality of vibrations indicative of the vibrations of the engine. The sampling frequency may be any suitable frequency, for example any frequency between 50 Hz-10,000 Hz, such as 200 Hz, or 1000 Hz, or 8000 Hz, or any frequency between 100 Hz-5000 Hz, such as 150 Hz, or 800 Hz, or 2000 Hz, or any frequency between 100 Hz-1000 Hz, such as 400 Hz, or 600 Hz, etc. The sampling frequency may be chosen in consideration of the maximum dominant frequency expected for the pressure variation and/or the engine vibration (for example, a sampling frequency that is sufficiently high to accurately measure the maximum expected dominant frequency in the pressure variation and/or engine vibration).

Figure 17:
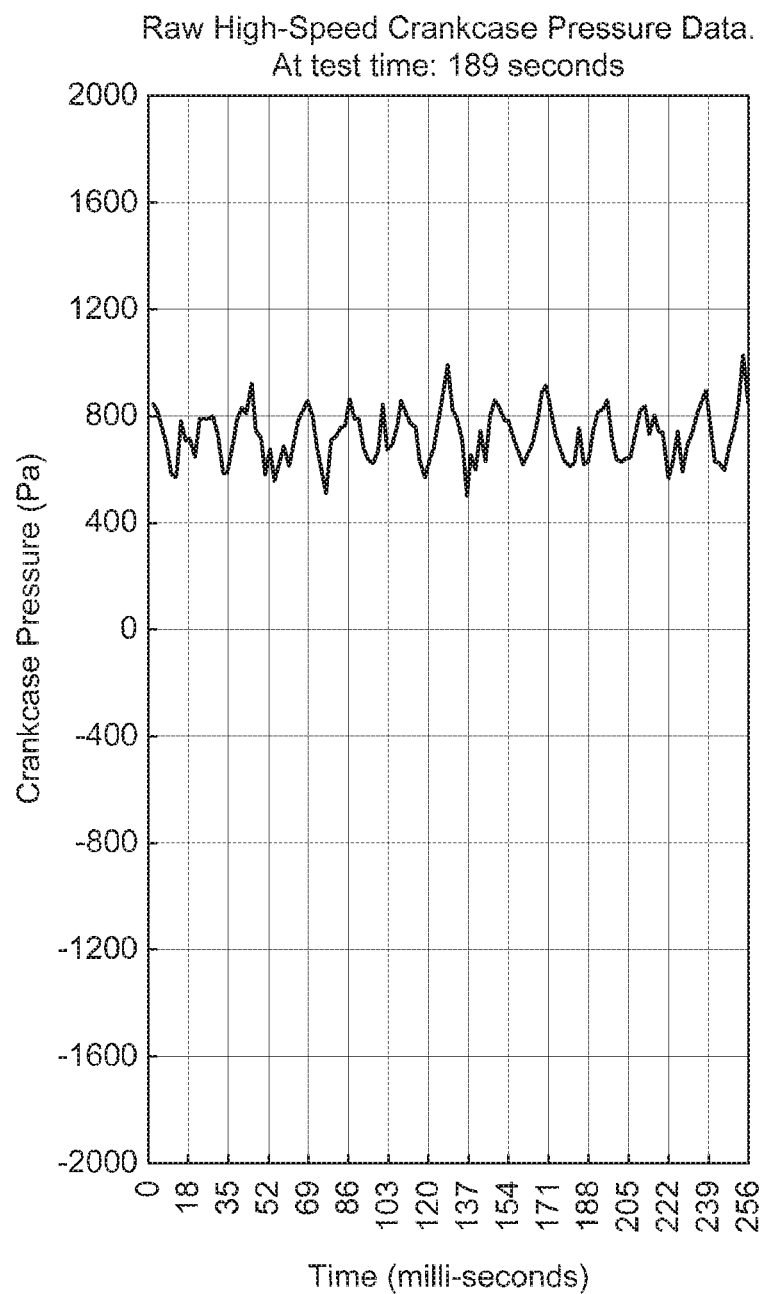
FIG. 17 shows a plot of an example engine pressure measurement taken by a monitoring device.
Figure 18:
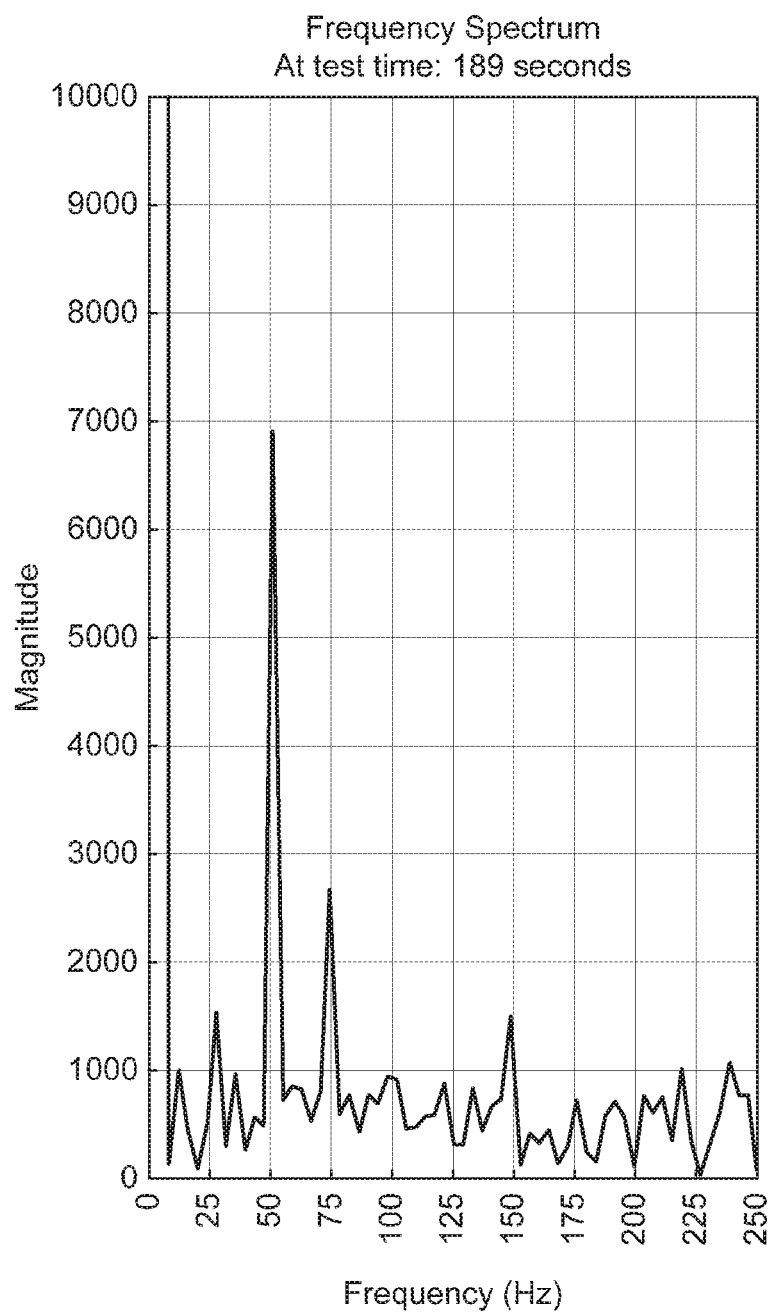
FIG. 18 shows a plot of the frequency response of the engine pressure measurement of FIG. 17.

FIG. 17 shows an example plot of the differential pressure sensor data. In this example, the sampling frequency is 500 Hz and the determination period of time is 0.256 second. The x-axis on the plot is the time and the y-axis on the plot is the difference between the crankcase pressure of the internal combustion engine and the ambient pressure in Pa.

The processor module 2139 determines engine parameter data of the internal combustion engine. In this example the engine parameter data is the firing frequency of the cylinders of the engine based on the generated pressure sensor data. Every time a cylinder fires in the internal combustion engine, the cylinder pressure increases, forcing the piston downwards. A small amount of this cylinder pressure will leak into the crankcase, past the piston rings and valve seals. Accordingly a pulse in the crankcase pressure is generate every time a cylinder fires. Viewed at high speed, the crankcase pressure pulses occur at a frequency equivalent to the firing frequency of the engine. So, by performing a time domain to frequency domain transformation of the generated pressure sensor data, engine parameter data in the form of the firing frequency of the internal combustion engine may be determined. The firing frequency of the internal combustion engine may be the dominant frequency present in the frequency domain transformation of the pressure sensor data. The processor module 2139 may determine the dominant frequency for example by performing a time-to-frequency domain transformation on the recorded engine vibration, such as a Fourier transform, or a Fast Fourier Transform (FFT), or a Laplace transform, etc.

The processor module 2139 may then allocate the firing frequency of the engine to be equal to the determined dominant frequency.

Having determined the firing frequency using the sensed pressure data, the processor module 2139 may record the results as described in the previously-described mode of operation to compile an aggregated summary of firing frequency data that can be broadcast and/or transmitted to the remote application in the manner described above. The use by the remote application of the firing frequency data to determine engine monitoring data, e.g. engine speed data, may be as described in the previous mode of operation.

In other respects the monitoring device 200 and operation of the remote application of this embodiment may be as described in the above embodiment. In particular, registration of the monitoring device using an identifier such as an optical or electronic code may be as described above.

In a further embodiment of this disclosure, the sensed characteristic of pressure may be used to produce engine parameter data in the form of pressure sensor data which may also be used to determine information regarding the average crankcase pressure, and preferably the torque output of the engine. The method according to this mode of operation may use a monitoring device 200 in the form of any of the dipstick 2100, the breather filter assembly 1200 or the oil filler cap 100 having a pressure sensor as described above.

Figure 15:
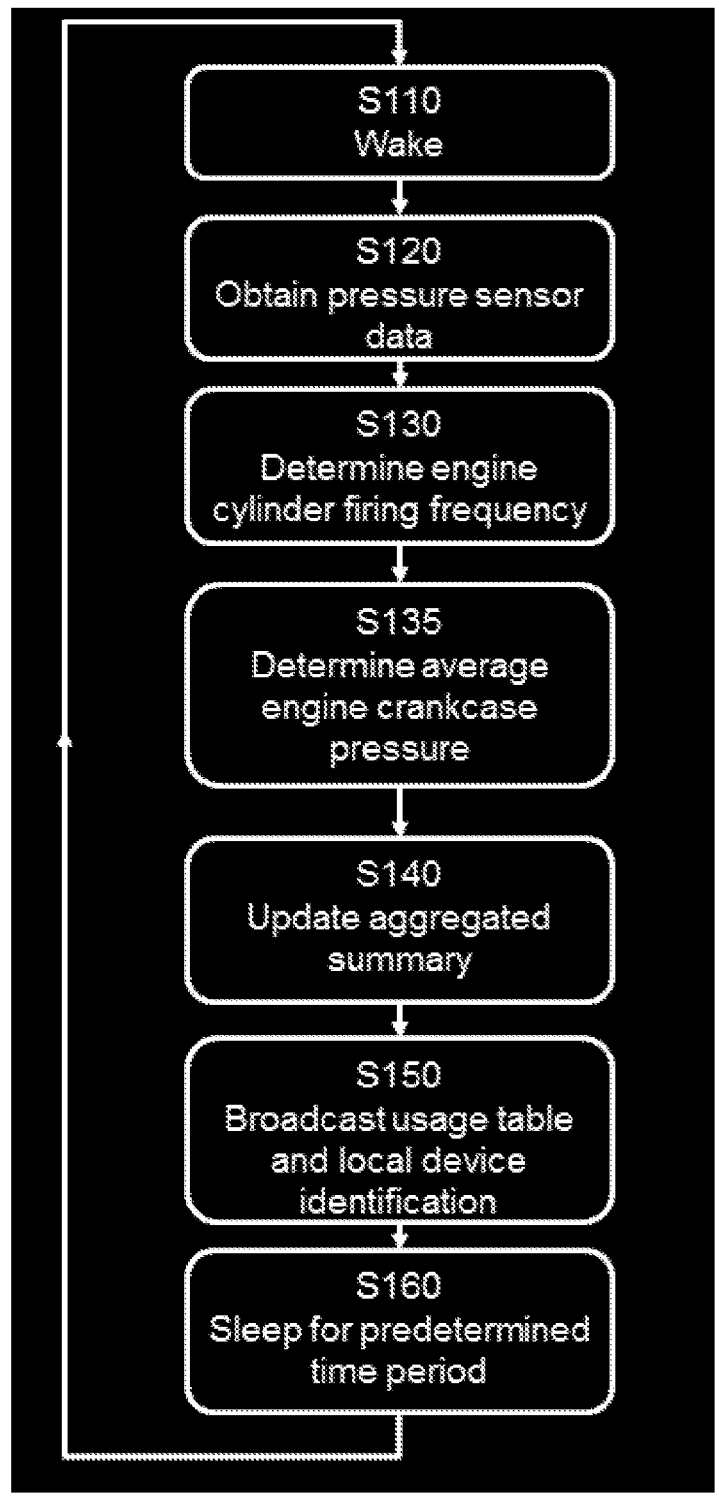
FIG. 15 shows a flow diagram representation of another mode of operation monitoring device of FIG. 2.
Figure 16:
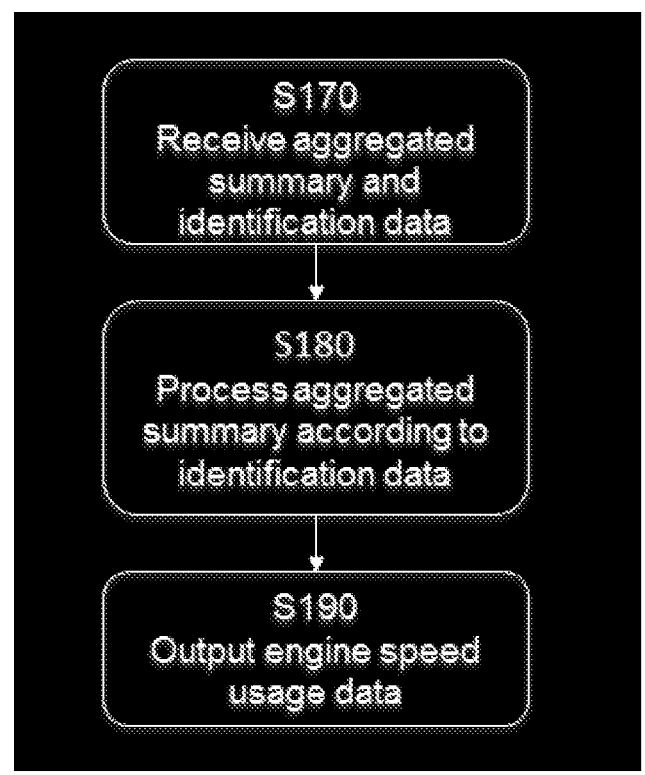
FIG. 16 shows a flow diagram representation of another mode of operation of a remote application.

FIGS. 15 and 16 show example flow diagrams for this mode of operation of the monitoring device 200 where the monitoring device 200 comprises a pressure sensor. The method according to this mode of operation may be performed using the monitoring device 200 incorporated in or attached to the internal combustion engine and a remote application running on the intermediate electronic device 310 and/or the remote device 320. FIG. 15 shows, by way of example, the method steps performed by the monitoring device 200 while FIG. 16 shows, by way of example, the method steps performed by the remote application running on the remote device 320.

The following discussion of the method according to this mode of operation will describe the steps taken by the monitoring device 200 in the form of the dipstick 2100. The skilled person will appreciate that the steps according to this mode of operation may equally be performed by a monitoring device 200 in the form of a breather filter assembly 1200 or the oil filler cap 100 having a pressure sensor.

As shown in FIG. 15, the monitoring device 200 performs a monitoring routine for monitoring the pressure of an engine crankcase.

Step S110 of waking, step S120 of obtaining pressure sensor data and step S130 of determining the engine cylinder firing frequency may be performed as described above. In summary, engine parameter data in the form of the firing frequency of the internal combustion engine may be determined by performing a time domain to frequency domain transformation of the generated pressure sensor data. The firing frequency of the internal combustion engine may be determined to be the dominant frequency present in the frequency domain transformation of the pressure sensor data. The processor module 2139 may determine the dominant frequency for example by performing a time-to-frequency domain transformation on the recorded engine vibration, such as a Fourier transform, or a Fast Fourier Transform (FFT), or a Laplace transform, etc. The processor module 2139 may then allocate the firing frequency of the engine to be equal to the determined dominant frequency in Step S130.

In step S135 of this further embodiment, further engine parameter data in the form of the average engine crankcase pressure is determined. Preferably, the root mean square (RMS) of the engine crankcase pressure is determined by the processor module 2139 from the data points recorded from the differential pressure sensor 2123.

In step S140 the determined values of engine firing frequency and RMS crankcase pressure are used to generate an aggregated summary of the engine usage. As with the previous embodiment, the aggregated summary comprises a plurality of elements which reflect the cumulative usage of the internal combustion engine. In this further embodiment, the elements of the aggregated summary are provided in a matrix form, whereby the determined values of engine firing frequency and RMS crankcase pressure are used to select an element to be updated.

The aggregated summary may comprise a plurality elements corresponding to ranges of engine cylinder firing frequencies and ranges of crankcase pressures. Each element in the aggregated summary containing a value indicative of the cumulative time for which the engine has been determined to be operating within engine cylinder firing frequency ranges and crankcase pressure range. As such, the aggregated summary is a data table comprising information regarding the usage history of the internal combustion engine for a plurality of ranges of engine firing frequencies and a plurality of crankcase pressure ranges. A non-limiting example of an aggregated summary according to this embodiment of the disclosure is shown in FIG. 19.

Figures 19, 20:
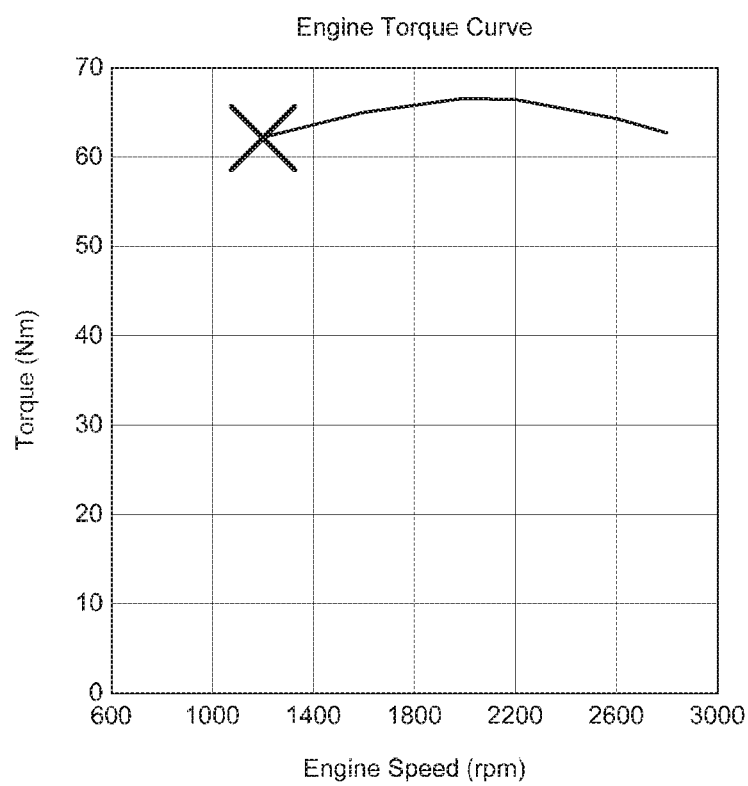
FIG. 19 shows an example results matrix of engine crankcase pressure and engine speed.
FIG. 20 shows a plot of an example engine speed-engine torque map.

In the aggregated summary of FIG. 19, the columns of the table/matrix represent columns of elements corresponding to ranges of engine cylinder firing frequency. The rows of the table/matrix represent rows of elements corresponding to RMS crankcase pressures (RMS CCPress (kPa)).

As an example of updating the aggregated summary, in the aggregated summary provided in FIG. 19 if the determined RMS crankcase pressure was 1.25 kPa and the determined engine cylinder firing frequency was 95 Hz, then the element with a value of 74 would be selected to be incremented by the determination time period.

As discussed for the previous embodiment, after step S140, the monitoring device 200 may proceed to a broadcasting step S150, or the monitoring device 200 may proceed to a sleep step S160 if it is not required to broadcast the aggregated summary at that point.

Broadcasting step S150 may be substantially the same as the broadcasting step S50 described above but broadcasting the larger aggregated summary with both crankcase pressure and engine cylinder firing frequency data included.

Sleep step S160 may be substantially the same as broadcasting step S60.

FIG. 16 shows the steps taken by the remote application to process the transmitted aggregated summary and identification data in order to generate engine monitoring data according to the further embodiment.

In step S170 the remote application receives the aggregated summary and identification data transmitted by the monitoring device 200. As such, step S170 may be substantially the same as step S70 of the previous embodiment.

In step S180 the remote application processes the aggregated summary based on the identification data. As with the previous embodiment, the remote application uses the identification data to determine engine monitoring data, for example engine usage data, of the internal combustion engine associated with the monitoring device 200 which may be output in step S190.

As discussed previously, the aggregated summary of this embodiment is a matrix of elements. As such, the aggregated summary effectively has axes of engine firing frequency and engine crankcase pressure. In step S180, the remote application processes the ranges in each of these axes to determine engine usage data.

Similar to the previous embodiment, the remote application may process the engine cylinder firing frequency ranges of the aggregated summary into engine speed ranges by looking up engine characterising data in the database for determining a number of combustion events per engine revolution of the internal combustion engine.

The remote application may also process the engine crankcase pressure ranges to determine engine torque output usage data for the internal combustion engine. The remote application may determine engine torque output usage data based on the engine crankcase pressure, the engine speed and engine characterising data stored in the database.

Crankcase pressure measurements may be converted into engine torque measurements if the engine torque curve is known for the internal combustion engine at that engine speed of operation. An example of an engine torque curve is shown in FIG. 20, which shows the maximum torque output of a specific internal combustion engine for a range of engine speeds.

In a closed circuit breather engine (i.e. an engine where the crankcase gasses are filtered and ingested by the engine), as engine torque increases the crankcase pressure decreases. In an open circuit breather engine (i.e. an engine where the crankcase gasses are filtered and vented to atmosphere), as engine torque increases the crankcase pressure increases.

Over a period of time, the monitoring device 200 will record the crankcase pressure of the monitored internal combustion engine operating at a range of different output torques for a range of different engine speeds. For a given engine speed, the aggregated summary may contain a number of elements indicating engine usage at a range of different crankcase pressures. As such, for a given engine speed the aggregated summary will provide an indication of the maximum and minimum crankcase pressures recorded at that engine speed. As the internal combustion engine may be operated at a range of different engine torque outputs from a minimum output (i.e. 0 Nm, 0% of maximum output) to a maximum output (i.e. 100% of the maximum output as indicated by the engine torque curve), the engine crankcase pressure ranges may be scaled to reflect the range of possible torque outputs. This could be achieved by linear scaling or exponential scaling, or a combination of both dependant on engine speed of interest.

Thus, the maximum torque output of the internal combustion engine for a given engine speed may be related to the maximum or minimum crankcase pressure range recorded for a given speed range in the aggregated summary, depending on the type of internal combustion engine being monitored.

Figure 21:
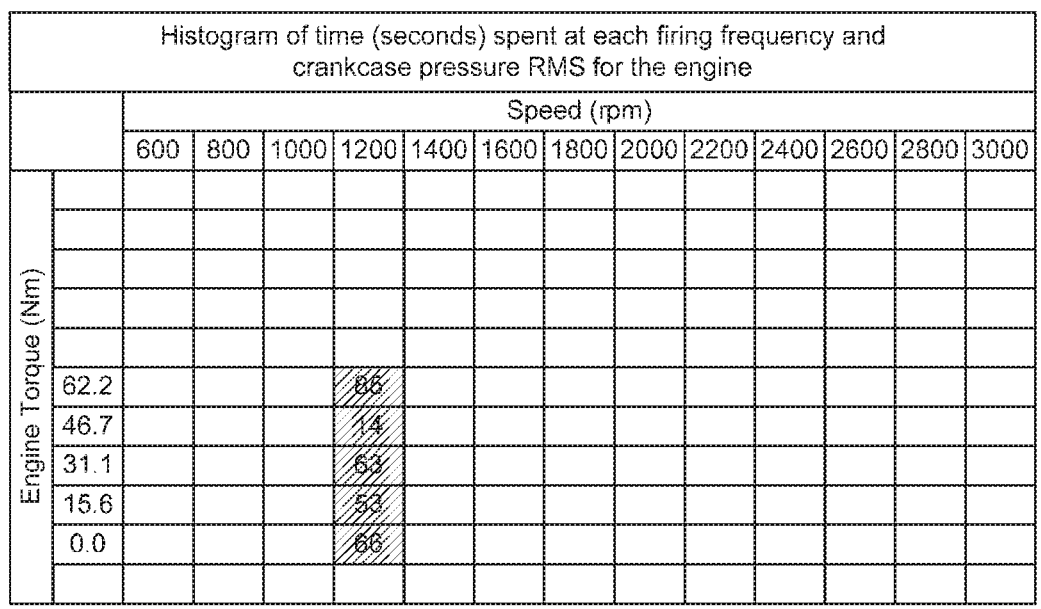
FIG. 21 shows a portion of an example results matrix of engine torque and engine speed.

For example, FIG. 21 shows an example of scaling the RMS crankcase pressure ranges for an engine speed range of 1100-1200 rpm. As shown in FIG. 21, the measured crankcase pressures in the aggregated summary for an engine speed of 1200-1400 rpm range from 0.6 kPa to 1.0 kPa, Based on the identification data transmitted along with the aggregated summary, an engine torque curve, or corresponding engine characterising data may be identified for the internal combustion engine being monitored. The engine characterising data (e.g. engine torque curve) indicates a maximum torque output for the internal combustion engine at a given engine speed. Where the engine speed is a range of engine speeds, the average engine speed for the range may be used. In this example, an engine speed of 1300 rpm may be used to determine that the maximum torque output for the engine may be 62.2 Nm. In this example, it is also known that the engine is an open circuit breather engine. Accordingly, the element corresponding to the maximum crankcase pressure range is set to be indicative of the maximum torque output (62.2 Nm) and the element corresponding to the minimum crankcase pressure is set to be indicative of the minimum torque output (0 Nm). The crankcase pressure ranges remaining between the maximum and minimum may be scaled between the maximum and minimum values.

The above described example for processing the engine crankcase pressure may be repeated for all engine speed ranges and stored or output by the remote application to a display. Accordingly, the high speed crankcase pressure data traces can be processed to extract a value proportional to torque, regardless of breather system. The remote application can therefore generate engine monitoring data reflecting the amount of time the internal combustion engine has spent operating at different torque outputs.

The skilled person will appreciate that over time the populated elements of the aggregated summary table will increase over time as the monitoring device 200 monitors the usage of the internal combustion engine. Accordingly, the accuracy of the engine torque output usage data may increase over time as the aggregated summary is populated.

In other respects the monitoring device 200 and operation of the remote application of this embodiment may be as described in the above embodiments. In particular, registration of the monitoring device using an identifier such as an optical or electronic code may be as described above.

Figure 23:
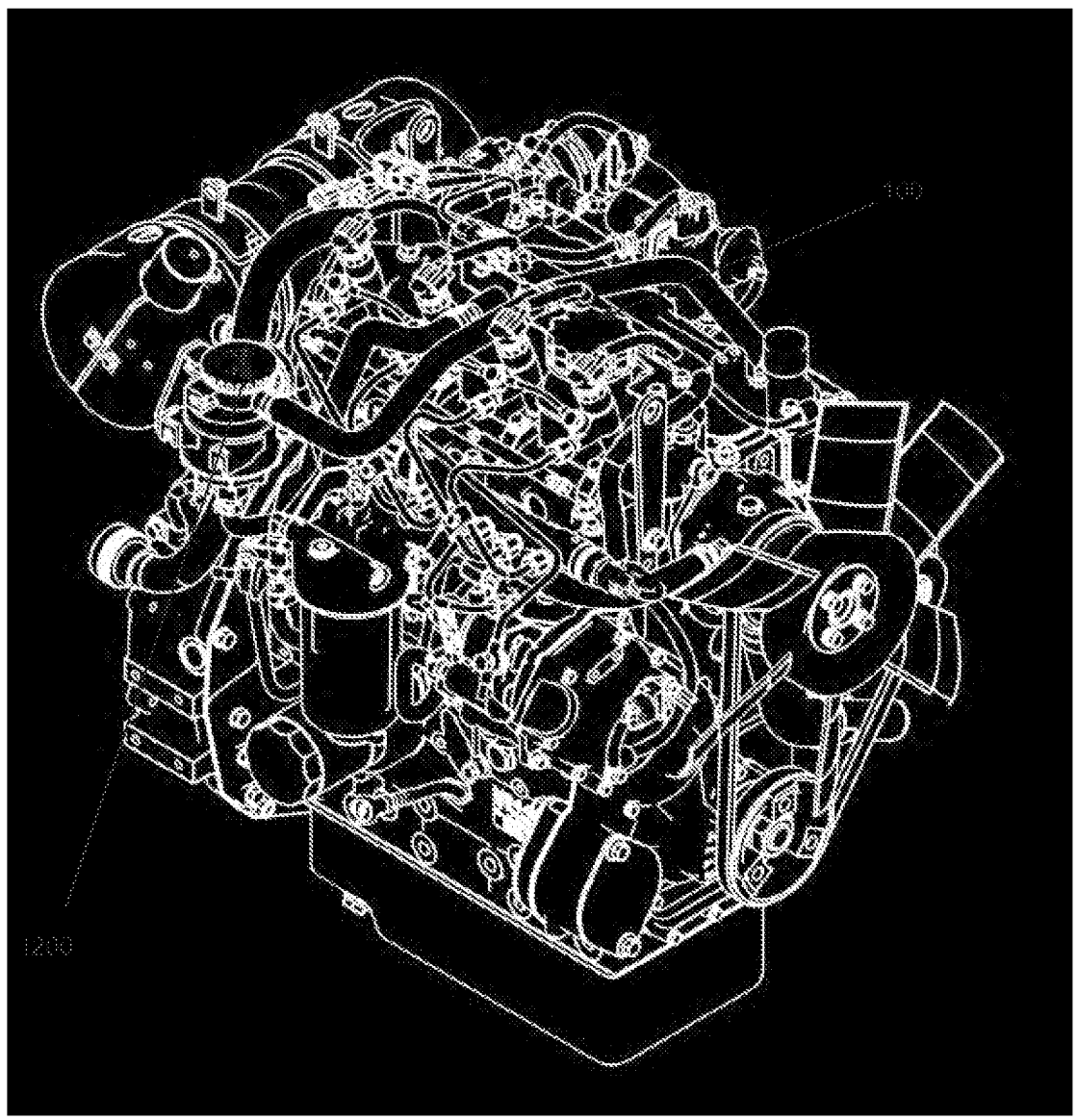
FIG. 23 shows an example internal combustion engine comprising the oil filler p of FIG. 3 and the breather filter assembly of FIG. 5.
Figure 24:
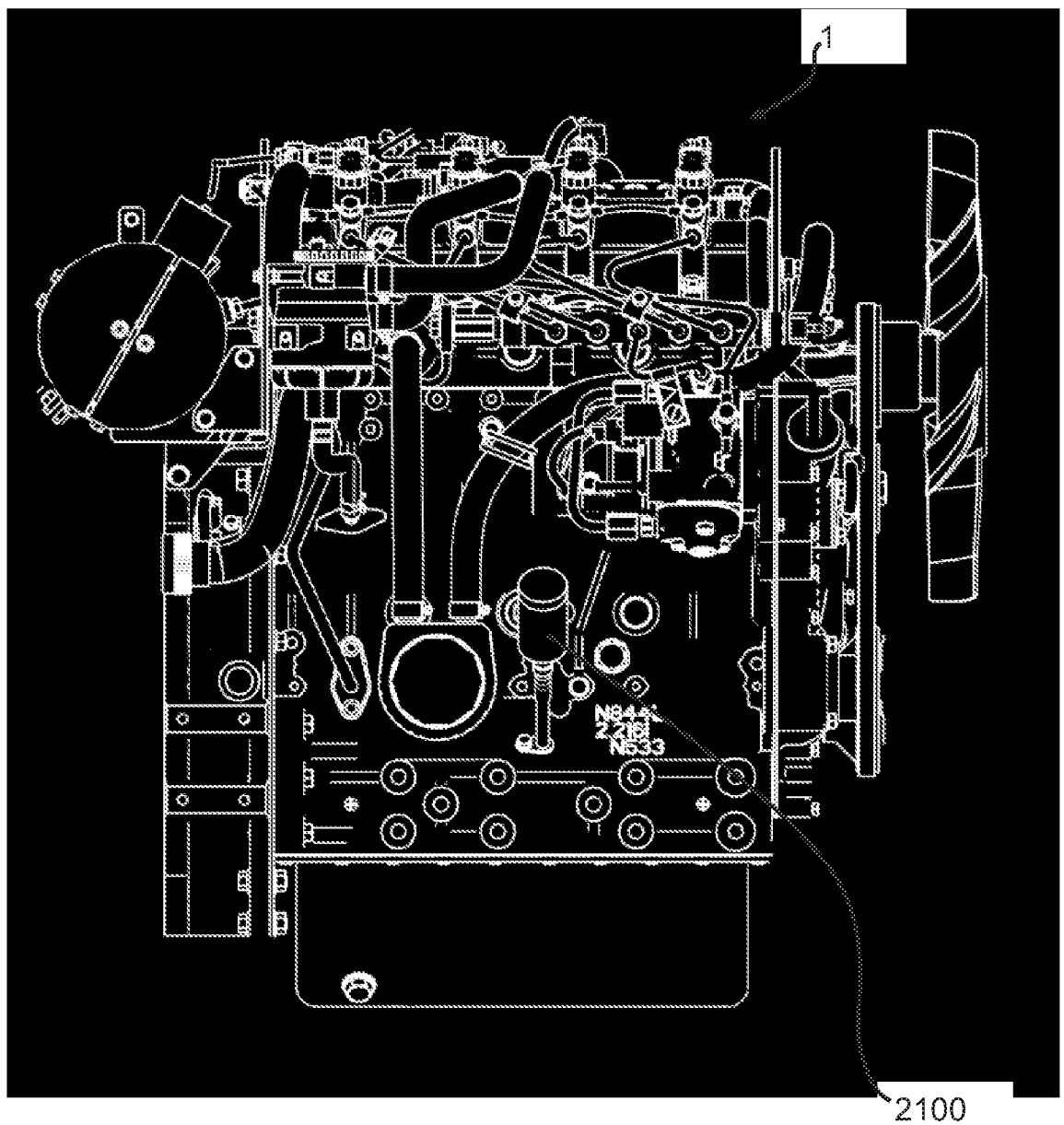
FIG. 24 shows an example internal combustion engine comprising the dipstick of FIG. 7.
Figure 25:
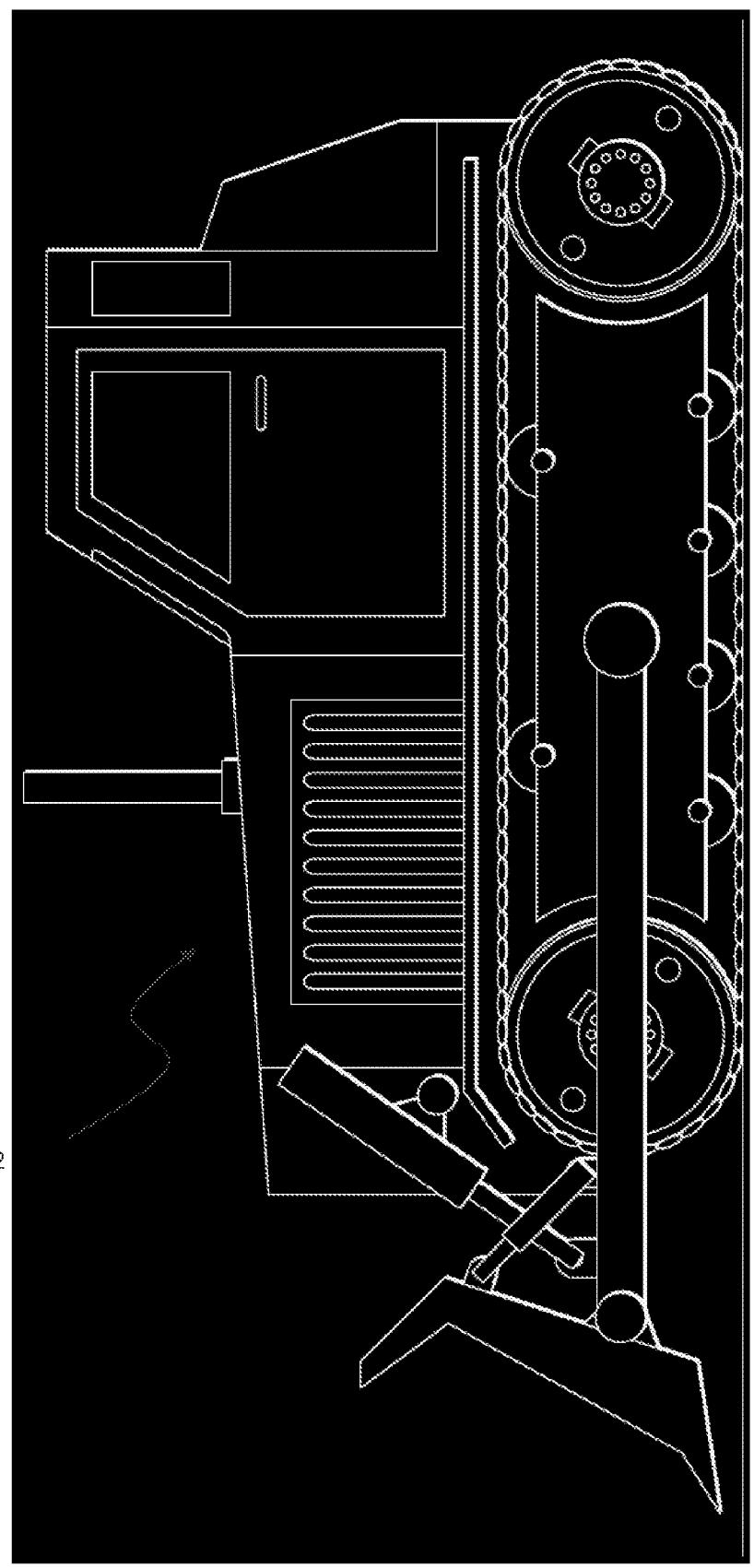
FIG. 25 shows an example machine comprising the internal combustion engine of FIG. 23 or FIG. 24.

As shown in FIGS. 23 and 24, one or more of the monitoring devices 200 described above may be incorporated in or directly attached to an internal combustion engine 1. The internal combustion engine 1 may form part of a machine. In FIG. 25 is shown an example machine 2 in the form of a dozer vehicle. In another example the machine may comprise a genset.

In a further embodiment of the present disclosure a plurality of monitoring devices 200 may be used together to form a monitoring ecosystem and method. The monitoring devices 200 may be as described in the above embodiments. The monitoring devices 200 may each have a vibration sensor 220 and/or a pressure sensor 260 and/or other sensors. Different monitoring devices 200 of the ecosystem may have different configurations of sensors.

In accordance with this embodiment a plurality of monitoring devices are incorporated in or directly attached to the internal combustion engine and/or the machine associated with the internal combustion engine. Each monitoring device senses a characteristic of the internal combustion engine and/or the machine. As will be seen from the above embodiments, the sensed characteristic may be, for example, vibration and/or crankcase pressure variation.

Figure 22:
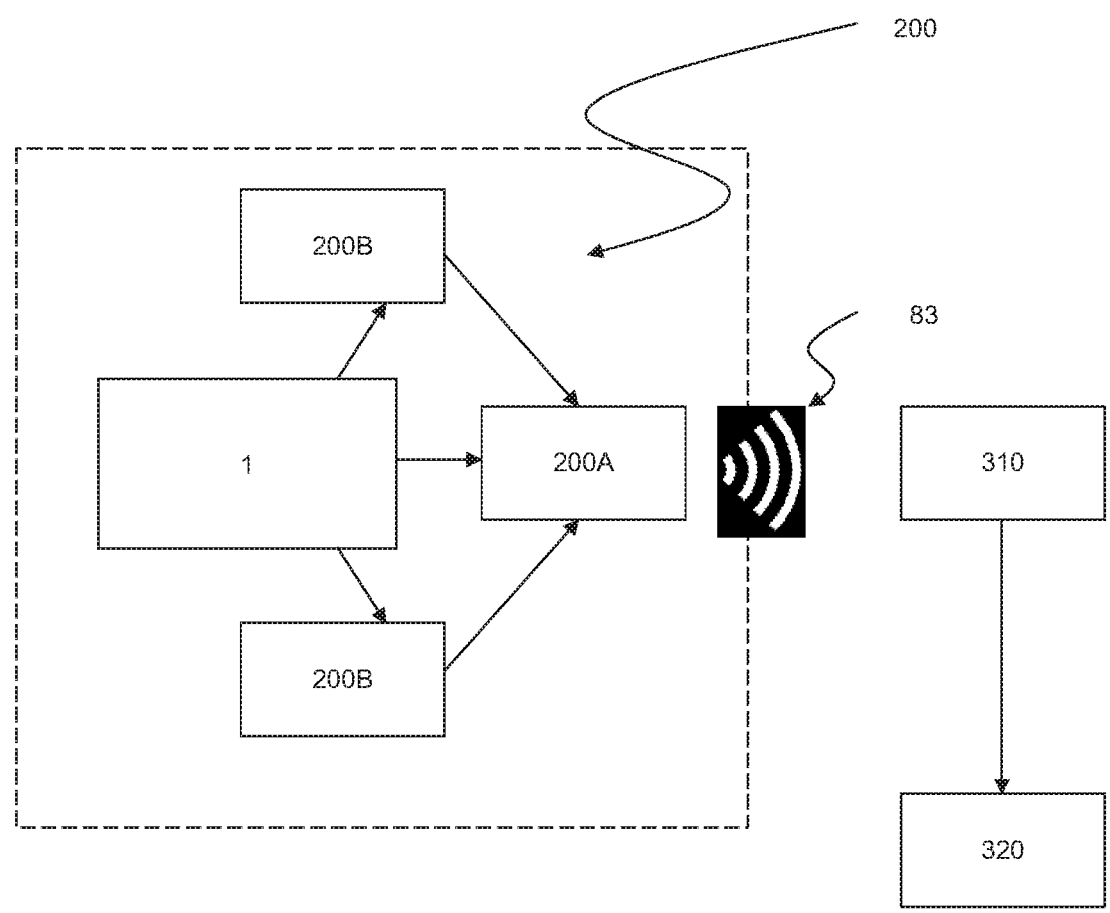
FIG. 22 shows a diagrammatic representation of a system for monitoring an internal combustion engine of a machine according to the present disclosure comprising a plurality of monitoring devices.

As shown schematically in FIG. 22, one of the plurality of monitoring devices 200 is configured to be a master monitoring device 200A and a remainder of the plurality of monitoring devices 200 are configured to be subsidiary monitoring devices 200B.

The master monitoring device 200A is incorporated in or directly attached to the internal combustion engine 1.

The master monitoring device 200A is used to transmit the data representative of the sensed characteristics from each of the plurality of monitoring devices 200 to the remote application running on the remote device 320 such that data from each of the subsidiary monitoring devices 200B is transmitted to the remote device 320 via the master monitoring device 200A. The master monitoring device 200A may establish a communications interface 83 with the remote device 320 and/or the intermediate electronic device 310. The communications interface 83 may be selected from the group comprising WiFi, Bluetooth, Bluetooth LE, Near Field Communications (NFC), Infra-red (IR), 5G, LTE, UMTS, EDGE, GPRS, GSM, or any other form of RF based data communications At least one of the plurality of monitoring devices 200, preferably the master monitoring device 200A, may process its sensed characteristic to produce engine parameter data in the manner described in the above embodiments. For example the engine parameter data may be firing frequency of the internal combustion engine and/or crankcase pressure of the internal combustion engine.

One or more other of the plurality of monitoring devices 200, for example the subsidiary monitoring devices 200B, may process its sensed characteristic to produce additional engine parameter data.

The master monitoring device 200A may transmit the engine parameter data and the additional engine parameter data to the remote application running on the remote device 320. Thus, the master monitoring device 200A may function as a communications hub for the plurality of monitoring devices 200. Therefore, the subsidiary monitoring devices 200B do not require a communication module that can interface with the remote device 320 and/or the intermediate electronic device 310. Rather, the subsidiary monitoring devices 200B only need a communication interface with the master monitoring device 200A. This communication interface may use, for example, Bluetooth, Bluetooth LE or Near Field Communications (NFC). Alternatively, a wired communication interface may be used between the subsidiary monitoring devices 200B and the master monitoring device 200A.

Each subsidiary monitoring device 200B may directly communicate with the master monitoring device 200A (as shown schematically in FIG. 22) and/or communicate with the master monitoring device 200A via another one or more subsidiary monitoring devices 200B (e.g. daisy-chaining).

The remote application may produce engine monitoring data (e.g. engine speed and/or engine torque) of the internal combustion engine by processing the data representative of the sensed characteristics and/or engine parameter data and/or additional engine parameter data that has been sensed by both the master monitoring device 200A and the subsidiary monitoring devices 200B. The processing of the engine parameter data to obtain engine monitoring data may be as described in any of the above embodiments.

For example, the remote application may receive aggregated summary data and identification data from the master monitoring device 200A. The aggregated summary data may contain the aggregated summary produced by one or more of the master monitoring device 200A and the subsidiary monitoring devices 200B.

The data may be received over a wireless network, or from the intermediate electronic device 310 forwarding on the transmitted data, or other means as discussed previously above. The aggregated summary received may be the most recently updated version of the aggregated summary stored in the memory module 230 of the master monitoring device 200A.

The identification data received by the remote application may be a unique identification code associated with the master monitoring device 200A which allows the remote application to determine the type of internal combustion engine which the master monitoring device 200A is monitoring. For example, the master monitoring device 200A may transmit master monitoring device identification data in the form of a MAC address of the master monitoring device 200A which is unique to the master monitoring device 200A.

The remote application may then consult a database to determine engine characterising data related to the internal combustion engine being monitored by the master monitoring device 200A, The master monitoring device 200A may append identification data to data from each of the subsidiary monitoring devices 200B before transmitting the data to the remote application. Alternatively, the database may be configured to recognise the data from the subsidiary monitoring devices 200B since they are packaged with data bearing the master monitoring device identification data.

The engine characterising data stored in the database may contain information regarding the master monitoring device 200A and/or the internal combustion engine associated with the master monitoring device 200A. For example, the database may have records for each internal combustion engine in a group of engines that are in current usage, Each engine record may hold information including one or more of the type of engine, the number of cylinders, the number of firing events per engine revolution, cylinder capacity, engine manufacturing date, engine commissioning date, machine type associated with the internal combustion engine, engine owner, engine operator, engine identification data, service interval data, engine component service life data, etc.

The database may contain a link associating each master monitoring device 200A with a specific internal combustion engine. This link may be generated when a user or installer performs an initial registration of the master monitoring device 200A when the master monitoring device 200A is fitted to the internal combustion engine. Initial registration may include sending information such as the master monitoring device identification code and an internal combustion engine serial code to the remote application and/or another remote server which then generates the database linkage between the database record containing the engine characterising data and the unique identification code associated with the master monitoring device 200A. In one example the unique identification code of the master monitoring device 200A may be added to the database record for the internal combustion engine.

The master monitoring device 200A may be provided with an identifier to facilitate registration. The identifier may be detectable by the remote application and/or the intermediate electronic device 310. For example, the identifier may be an optical or electronic code that can be detected by a reader in the intermediate electronic device 310. In one example the master monitoring device 200A may bear a barcode or QR code that can be detected by a camera of the intermediate electronic device 310. In another example the identifier may be an RFID tag that is detected by an RFID reader in the intermediate electronic device 310.

In one example, the masker monitoring device 200A may be an oil filler cap 100 comprising a vibration sensor 220 and a first subsidiary monitoring device 200B may be a dipstick 2100 comprising a pressure sensor. A second subsidiary monitoring device 200B may be a temperature sensor attached to a portion of the internal combustion engine.

The skilled person will recognise that the number and nature of the subsidiary monitoring devices 200B may be varied. The ecosystem may comprise more than two subsidiary monitoring devices 200B. The subsidiary monitoring devices 200B may monitor the same or different internal combustion engines.

In the present ecosystem the intermediate electronic device 310 may receive data from a plurality of master monitoring devices 200A (for example installed on different machines) and transmit the data onwards to the remote device 320. The intermediate electronic device 310 may be configured to relay information from all master monitoring devices 200A that are within range. The relay of information may function as a background process on the intermediate electronic device 310. Optionally, the remote device 20 may transfer back information to the intermediate electronic device 310 for display to a user. For example, the information may comprise engine monitoring data. Display of information to a user may be restricted by using user privilege settings on the intermediate electronic device 310 and/or the remote device 320.

In any of the above embodiments a monitoring device may be further configured to sense at least one additional characteristic, wherein the additional characteristic may be selected from the group comprising a GPS location of the internal combustion engine, an elevation of the internal combustion engine, an environmental temperature surrounding the internal combustion engine and valve position timing information of the internal combustion engine.

INDUSTRIAL APPLICABILITY

By providing a method of and a system for monitoring the usage of an internal combustion engine according to the present disclosure, engine usage data about an internal combustion engine may be gathered by a remote application. In particular, engine speed usage data and/or engine torque data may be determined from an aggregated summary generated by one or more monitoring devices incorporated in or attached to the internal combustion engine. The data gathered by the monitoring device may be processed by the remote application, and so the method of monitoring according to the disclosure may not require any calibration or initial set up of the monitoring device in order to be performed.

Advantageously, the monitoring device is incorporated in or attached to the internal combustion engine which may allow a greater accuracy of sensing of the vibrations and or pressure variations of the internal combustion engine compared to a sensor affixed to another part of the machine such as a vehicle chassis, body panel, windscreen, etc. In this way the monitoring device may directly sense vibration and pressure changes of the engine and not rely on consequential vibrations of other parks of the machine which may include other noise and resonant frequencies imparted by the other parts of the machine.

Advantageously, the monitoring device may perform an additional non-monitoring function associated with the internal combustion engine, wherein optionally the additional non-monitoring function is to provide an interface with, or access point to, an oil system of the internal combustion engine. In this way the monitoring device can be more easily accommodated as additional space or an additional mounting point on the internal combustion engine does not need to be provided.

Advantageously, as the monitoring device may not require any initial set up or calibration, it may be easily installed or retrofitted to a wide range of internal combustion engines. For example, the monitoring device may be provided as part an engine oil filler cap, a breather filter assembly, or an engine oil dipstick. Each of these parts are easily accessible and easily replaceable, meaning that old, standard engine oil filler caps/breather filter assemblies/engine oil dipsticks may be easily replaced with a monitoring device for use with the method of the present disclosure.

The method and system according to the present disclosure may allow the monitoring device to be easily registered with a database stored remotely from the monitoring device. The database may contain engine characterising data on the internal combustion engine. Registering the monitoring device may provide a quick means to establish a linkage between the monitoring device and the database such that processing of sensed data by the remote application may be carried out using correct engine characterising data.

The method and system according to the present disclosure may determine engine speed usage data by processing the determined firing frequencies using engine characterising data relating to the number of firing events per revolution of the internal combustion engine. By storing this data remotely, the storage and processing requirements of the monitoring device may be reduced, which in turn means the monitoring device may save space and or/power consumption and/or be less expensive.

The engine monitoring routine performed by the monitoring device may be repeated over a period of time to generate an aggregated summary reflecting the usage of the internal combustion engine over the monitored period of time. Accordingly, the remote application may accumulate and monitor the usage of the internal combustion engine by tracking the updated aggregated summary over time. The monitoring device may monitor the internal combustion engine whenever the internal combustion engine is running.

The monitoring device may store and accumulate data between periodic transmissions, optionally wherein the periodic transmissions may be at a frequency of less than 1440 times a day, or less than 48 times a day, or less than 24 times a day, or less than 12 times a day, or less than 6 times a day, or once a day.

The engine monitoring routine performed by the monitoring device may include updating elements of the aggregated summary based on the determined frequency of the internal combustion engine. By updating the aggregated summary in this way, the amount of data recorded and stored by the monitoring device is kept to a minimum, as opposed to logging each entry separately. By only updating a single element of the aggregated summary each time the monitoring routine is performed, power consumption may be further reduced, as opposed to writing the entire aggregated summary or individual data entries each time to the memory.

Since the amount of data stored in the aggregated summary may be configured not to increase with time (while the count for each data combination increases with time, the actual amount of data does not increase with time), the amount of data to be transmitted remains modest throughout the lifetime of engine use. Also, if data transmitted by the communications module is occasionally not received by the intended recipient, it is of no long term consequence since the next aggregated summary that is received successfully will provide all of the aggregated data up to that point (which includes the previously unreceived data). In addition, the modest data requirements of the methods and systems of the present disclosure may only require very limited bandwidth requirements for the communications interface.

The monitoring device according to the present disclosure may transmit/broadcast the aggregated summary and identification data to a remote application using, at least in park, a wireless network. By using a wireless network to transmit/broadcast the usage data and identification information to the remote application, a wired connection connecting to the monitoring device may not be required. Furthermore, as the monitoring device includes means for wirelessly communicating with a remote application, the monitoring device may be fitted to internal combustion engines where an external communication system is not available. For example, the monitoring device may be provided as part an engine oil filler cap, a breather filter assembly, or an oil dipstick. Accordingly, the method and system of monitoring according to the present disclosure may be applied/retrofitted to legacy internal combustion engines where monitoring of engine usage was not previously available.

The monitoring device according to the present disclosure may transmit/broadcast the aggregated summary and identification data to a remote application via an intermediate electronic device. This may allow the power requirements of the monitoring device to be reduced since only a short range communication interface may be required with the intermediate electronic device. The short range communication interface may be for example a Bluetooth connection.

The method of and system for monitoring according to this disclosure may utilise pressure sensor data to determine engine usage data including engine speed usage data and engine torque output data. Accordingly, the method of and system for monitoring may generate two sets of usage parameters from a single sensor attached to an internal combustion engine. Thus the method of and system for monitoring may be highly efficient in terms of the hardware requirements for the monitoring device and the subsequent processing of the aggregated summary in the remote application.

A monitoring ecosystem and method may be provided according to the present disclosure. Accordingly, a plurality of monitoring devices may be incorporated in or directly attached to an internal combustion engine and/or a machine associated with the internal combustion engine. The use of a master monitoring device and subsidiary monitoring devices may reduce overall costs since only the master monitoring device needs to have a communication interface capable of interfacing with the intermediate electronic device and/or the remote device. Also, the registration process is simplified as only one monitoring device needs to be registered with the database held on the remote device.

The master monitoring device may function as a communications hub for the plurality of monitoring devices. Therefore, the subsidiary monitoring devices do not require a communication module that can interface with the remote device and/or the intermediate electronic device. This may allow the use of simpler, smaller subsidiary monitoring devices.

In any of the above embodiments a monitoring device may be further configured to sense at least one additional characteristic, wherein the additional characteristic may be selected from the group comprising a GPS location of the internal combustion engine, an elevation of the internal combustion engine, an environmental temperature surrounding the internal combustion engine and valve position timing information of the internal combustion engine.

Accordingly, a method of and system for monitoring an internal combustion engine using a monitoring device and a remote application is hereby disclosed. The methods and systems according to this disclosure may be implemented on any type of internal combustion engine. For example the internal combustion engine may be provided in machinery such as a genset, a tractor, an excavator, a truck, a wheel loader, or a compactor. Accordingly, usage data relating to any of the above described machinery may also be determined based on the accumulated engine usage data provided by the method of and system for monitoring according to this disclosure.

The invention claimed is:

1. A method for monitoring an internal combustion engine of a machine comprising:
    providing a plurality of monitoring devices incorporated in or directly attached to the internal combustion engine and/or the machine;
    each monitoring device sensing a characteristic of the internal combustion engine and/or the machine;
    configuring one of the plurality of monitoring devices to be a master monitoring device and configuring a remainder of the plurality of monitoring devices to be subsidiary monitoring devices, wherein the master monitoring device is incorporated in or directly attached to the internal combustion engine and the master monitoring device performs an additional non-monitoring function associated with the internal combustion engine, wherein the additional non-monitoring function is to provide an interface with, or access point to, an oil system of the internal combustion engine; and
    using the master monitoring device to transmit data representative of the sensed characteristics from each of the plurality of monitoring devices to a remote application running on a remote device such that data from each of the subsidiary monitoring devices is transmitted to the remote device via the master monitoring device.

2. The method of claim 1, wherein at least one of the plurality of monitoring devices, preferably the master monitoring device, processes its sensed characteristic to produce engine parameter data;
    and optionally wherein one or more other of the plurality of monitoring devices processes its sensed characteristic to produce additional engine parameter data.

3. The method of claim 2, wherein the master monitoring device transmits the engine parameter data to the remote application running on the remote device.

4. The method of claim 2, further comprising using the remote application to produce engine monitoring data of the internal combustion engine by processing the data representative of the sensed characteristics and/or engine parameter data;
    and optionally wherein processing the data representative of the sensed characteristics and/or the engine parameter data utilises engine characterising data of the internal combustion engine which is stored on the remote device.

5. The method of claim 1, wherein at least one of the plurality of monitoring devices senses a vibration of the internal combustion engine and/or a crankcase pressure of the internal combustion engine;
    and optionally wherein said at least one of the plurality of monitoring devices produces engine parameter data comprising data representative of a firing frequency of the internal combustion engine and/or a crankcase pressure of the internal combustion engine and/or hours of operation of the internal combustion engine;
    and optionally wherein the data representative of a firing frequency of the internal combustion engine and/or a crankcase pressure of the internal combustion engine is processed by the remote application to produce data representative of an engine speed of the internal combustion engine by using the data representative of the firing frequency of the internal combustion engine and data stored on the remote device that is representative of a number of cylinders of the internal combustion engine;
    and optionally wherein the data representative of the crankcase pressure of the internal combustion engine and. the data representative of the engine speed of the internal combustion engine is processed by the remote application to produce data representative of an engine torque of the internal combustion.

6. The method of claim 1, further comprising the step of registering the master monitoring device with the remote application; wherein optionally the master monitoring device is provided with an identifier that can he detected by the remote application to facilitate registration; wherein optionally the identifier is an optical code, such as a barcode or QR code, or an electronic code, such as an RFID;
    and optionally wherein during the step of registration, data relating to an internal combustion engine and/or machine stored in a database record on the remote device is associated with the master monitoring device.

7. The method of claim 1, wherein the master monitoring device transmits master monitoring device identification data to the remote application and the remote device contains a database record associating the master monitoring device identification data with a specific internal combustion engine and/or master monitoring device such that the remote application can associate data received from the master monitoring device with the specific internal combustion engine.

8. The method of claim 1, wherein the master monitoring device is fluidly coupled to a crankcase of the internal combustion engine;
    and optionally wherein the master monitoring device monitors a pressure characteristic of the crankcase of the internal combustion engine.

9. The method of claim. 1, wherein the remote application is configured to he receive data from a plurality of master monitoring devices associated with a plurality of internal combustion engines.

10. The method of claim 1, wherein transmitting the data representative of the sensed characteristics from the master monitoring device to the remote application running on the remote device comprises transmitting the data representative of the sensed characteristics via an intermediate device, wherein optionally the intermediate device is a smartphone and/or a tablet computer and/or a laptop computer.

11. A system for monitoring an internal combustion engine of a machine comprising:
    a plurality of monitoring devices incorporated in or directly attached to the internal combustion engine and/or the machine, one of which is configured to be a master monitoring device and which is incorporated in of directly attached to the internal combustion engine and a remainder of the plurality of monitoring devices are configured to be subsidiary monitoring devices; and
    a remote application configured to run on a remote device;
    each monitoring device comprising a sensor configured to sense a characteristic of the internal combustion engine and/or the machine;

each of the subsidiary monitoring devices comprising a communications module configured to transmit data to the master monitoring device;

the master monitoring device comprising a communication module configured to transmit data received from the subsidiary monitoring devices and data produced by the master monitoring device to the remote application running on the remote device, wherein the master monitoring device is configured to perform an additional non-monitoring function associated with the internal combustion engine, wherein the additional non-monitoring function is to provide an interface with, or access point to, an oil system of the internal combustion engine.

12. The system of claim 11, wherein at least one of the plurality of monitoring devices comprises a pressure sensor configured to sense a crankcase pressure of the internal combustion engine and/or a vibration sensor configured to sense a vibration of the internal combustion engine.

13. The system of claim 12, wherein said at least one of the plurality of monitoring devices comprises a processor configured to produce engine parameter data comprising data representative of a firing frequency of the internal combustion engine and/or a crankcase pressure of the internal combustion engine and/or hours of operation of the internal combustion engine;

and optionally wherein the remote application is configured to produce data representative of an engine speed of the internal combustion engine by using the data representative of the firing frequency of the internal combustion engine and data representative of a number of cylinders of the internal combustion engine stored on the remote device and optionally wherein the remote application is configured to produce data representative of an engine torque of the internal combustion engine by using the data representative of the crankcase pressure of the internal combustion engine and the data representative of the engine speed of the internal combustion engine.

14. The system of claim 11, wherein the master monitoring device is provided with an identifier; wherein optionally the identifier is an optical code, such as a barcode or QR code, or an electronic code, such as an RFID;

and optionally wherein the master monitoring device is configured to be registered with the remote application using the identifier;

and optionally wherein the master monitoring device is configured to transmit master monitoring identification data to the remote application and the remote device contains a database record associating the master monitoring identification data with a specific internal combustion engine and/or master monitoring device.

15. The system of claim 11, wherein the master monitoring device is fluidly coupled to a crankcase of the internal combustion engine and optionally wherein the master monitoring device is configured to monitor a pressure characteristic of the crankcase of the internal combustion engine;

and optionally wherein the master monitoring device is formed by or incorporated in an engine oil filler cap, an engine oil dipstick or a breather filter assembly of the internal combustion engine.

16. A system for monitoring an internal combustion engine of a machine comprising:

a plurality of monitoring devices incorporated in or directly attached to the internal combustion engine and/or the machine, one of which is configured to be a master monitoring device and which is incorporated in of directly attached to the internal combustion engine and a remainder of the plurality of monitoring devices are configured to be subsidiary monitoring devices, at least one of the plurality of monitoring devices comprises a pressure sensor configured to sense a crankcase pressure of the internal combustion engine or a vibration sensor configured to sense a vibration of the internal combustion engine;

a remote application configured to run on a remote device;

each monitoring device comprising a sensor configured to sense a characteristic of the internal combustion engine and/or the machine;

each of the subsidiary monitoring devices comprising a communications module configured to transmit data to the master monitoring device; and the master monitoring device comprising a communication module configured to transmit data received from the subsidiary monitoring devices and data produced by the master monitoring device to the remote application running on the remote device.

17. The system of claim 16, wherein the remote application is configured to receive data from a plurality of master monitoring devices associated with a plurality of internal combustion engines.

* * * * *